(12) United States Patent
Backhaus et al.

(10) Patent No.: US 12,069,207 B2
(45) Date of Patent: *Aug. 20, 2024

(54) MOBILE APPLICATION FOR PROVIDING MULTIPLE SECOND LINE NUMBERS ON SINGLE MOBILE DEVICE

(71) Applicant: Movius Interactive Corporation, Duluth, GA (US)

(72) Inventors: George Backhaus, Suwanee, GA (US); Jignesh Gandhi, Duluth, GA (US); Julio Gonzalez, Tucker, GA (US); John Green, Roswell, GA (US); Philip Lowman, Ellijay, GA (US); Paul Rubenstein, Johns Creek, GA (US); Mike Speanburg, Lawrenceville, GA (US)

(73) Assignee: Movius Interactive Corporation, Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/107,989

(22) Filed: Feb. 9, 2023

(65) Prior Publication Data

US 2023/0188953 A1 Jun. 15, 2023

Related U.S. Application Data

(63) Continuation of application No. 17/085,751, filed on Oct. 30, 2020, now Pat. No. 11,606,673, which is a
(Continued)

(51) Int. Cl.
*H04M 3/54* (2006.01)
*H04L 65/1046* (2022.01)
*H04L 65/1069* (2022.01)
*H04M 3/42* (2006.01)
*H04M 7/12* (2006.01)
*H04W 4/14* (2009.01)
(Continued)

(52) U.S. Cl.
CPC .......... *H04M 3/54* (2013.01); *H04L 65/1046* (2013.01); *H04L 65/1069* (2013.01); *H04M 3/42255* (2013.01); *H04M 7/127* (2013.01); *H04W 4/14* (2013.01); *H04W 4/16* (2013.01); *H04W 8/26* (2013.01); *H04W 76/10* (2018.02)

(58) Field of Classification Search
None
See application file for complete search history.

(56) References Cited

U.S. PATENT DOCUMENTS 9,185,628 B2 11/2015 Lowman et al.
9,332,128 B2 5/2016 Backhaus et al.
(Continued)

*Primary Examiner* — Quynh H Nguyen
(74) *Attorney, Agent, or Firm* — Smith Tempel Blaha LLC; Gregory Scott Smith

(57) ABSTRACT

A mobile application and a method are described for servicing a second line service ("SLS") based communication request originating from a subscriber's telecommunications device ("TD") even if the call signal does not include sufficient information to identify the phone number from which the subscriber initiated the call. The method involves associating the SLS phone number of the subscriber, the primary number of the subscriber and the primary number of a third party via a special relationship number.

14 Claims, 11 Drawing Sheets

Related U.S. Application Data continuation of application No. 16/401,289, filed on May 2, 2019, now Pat. No. 10,856,114, which is a continuation of application No. 15/688,867, filed on Aug. 29, 2017, now Pat. No. 10,321,282, which is a continuation of application No. 15/081,910, filed on Mar. 27, 2016, now Pat. No. 9,854,417, which is a continuation of application No. 14/727,848, filed on Jun. 1, 2015, now Pat. No. 9,332,128, which is a continuation-in-part of application No. 14/307,407, filed on Jun. 17, 2014, now Pat. No. 9,185,628, and a continuation-in-part of application No. 13/920,056, filed on Jun. 17, 2013, now Pat. No. 9,332,425, which is a continuation-in-part of application No. 13/466,074, filed on May 7, 2012, now Pat. No. 9,332,408, said application No. 14/727,848 is a continuation-in-part of application No. 13/466,074, filed on May 7, 2012, now Pat. No. 9,332,408, and a continuation-in-part of application No. 12/133,996, filed on Jun. 5, 2008, now abandoned.

(60) Provisional application No. 61/836,145, filed on Jun. 17, 2013, provisional application No. 61/660,772, filed on Jun. 17, 2012.

(51) Int. Cl.
*H04W 4/16* (2009.01)
*H04W 8/26* (2009.01)
*H04W 76/10* (2018.01)

(56) References Cited

U.S. PATENT DOCUMENTS

| | | | |
|---|---|---|---|
| 9,332,408 B2 | 5/2016 | Lowman et al. | |
| 9,332,425 B2 | 5/2016 | Backhaus et al. | |
| 9,854,417 B2 | 12/2017 | Backhaus et al. | |
| 9,967,797 B2 | 5/2018 | Backhaus et al. | |
| 2009/0217048 A1* | 8/2009 | Smith | H04W 12/041 713/176 |
| 2010/0177662 A1* | 7/2010 | Meincke | H04Q 3/0025 370/254 |
| 2015/0271774 A1 | 9/2015 | Backhaus | |
| 2016/0021248 A1 | 1/2016 | Backhaus | |
| 2018/0132074 A1 | 5/2018 | Backhaus | |
| 2019/0261141 A1 | 8/2019 | Backhaus et al. | |
| 2021/0051452 A1 | 2/2021 | Backhaus et al. | |

* cited by examiner

305
Second Line Service Master ID Table

| Subscriber | 2nd Line Number | Primary Number |
|---|---|---|
| 1 | +1.770.555.0001 | +1.408.544.1212 |
| 2 | +1.770.555.0002 | |
| 3 | +1.770.555.0003 | |
| 4 | +1.770.555.0004 | |
| 5 | +1.770.555.0005 | |
| ... | ... | |
| 9,999 | +1.770.555.9999 | |

310
Subscriber Relationship ID Table
(Subscriber 1)

| Subscriber Contact | Relationship Number | 3rd Party Number |
|---|---|---|
| 1 | +1.678.222.0001 | +1.305.229.9999 |
| 2 | +1.678.222.0002 | +1.212.777.8888 |
| 3 | +1.678.222.0003 | +1.408.333.2222 |
| 4 | +1.678.222.0004 | |
| 5 | +1.678.222.0005 | |
| ... | ... | |
| 9,999 | +1.678.222.9999 | |

Central SLS Database 116

FIG. 3A

315
Subscriber Relationship ID Table

| Subscriber Contact | Relationship Number | 3rd Party Number |
|---|---|---|
| 1 | +1.678.222.0001 | +1.305.229.9999 |
| 2 | +1.678.222.0002 | +1.212.777.8888 |
| 3 | +1.678.222.0003 | +1.408.333.2222 |
| 4 | +1.678.222.0004 | |
| 5 | +1.678.222.0005 | |
| ... | ... | |
| 9,999 | +1.678.222.9999 | |

Local SLS Database 106

FIG. 3B

305
Second Line Service Master ID Table

| Subscriber | 2nd Line Number | |
|---|---|---|
| 1 | +1.770.555.0001 | |
| 2 | +1.770.555.0002 | |
| 3 | +1.770.555.0003 | |
| 4 | +1.770.555.0004 | |
| 5 | +1.770.555.0005 | |
| ... | ... | |
| 9,999 | +1.770.555.9999 | |

320
Subscriber Special Relationship ID Table (Subscriber 1)

| Subscriber Contact | Special Relationship Number | 3rd Party Number |
|---|---|---|
| 1 | +1.678.333.0001 | +1.305.229.9999 |
| 2 | +1.678.333.0002 | +1.212.777.8888 |
| 3 | +1.678.333.0003 | +1.408.333.2222 |
| 4 | +1.678.333.0004 | |
| 5 | +1.678.333.0005 | |
| ... | ... | |
| 9,999 | +1.678.333.9999 | |

Central SLS Database 116

FIG. 3C

325
Subscriber Special Relationship ID Table

| Subscriber Contact | Special Relationship Number | 3rd Party Number |
|---|---|---|
| 1 | +1.678.333.0001 | +1.305.229.9999 |
| 2 | +1.678.333.0002 | +1.212.777.8888 |
| 3 | +1.678.333.0003 | +1.408.333.2222 |
| 4 | +1.678.333.0004 | |
| 5 | +1.678.333.0005 | |
| ... | ... | |
| 9,999 | +1.678.333.9999 | |

Local SLS Database 106

FIG. 3D

MOBILE APPLICATION FOR PROVIDING MULTIPLE SECOND LINE NUMBERS ON SINGLE MOBILE DEVICE

BACKGROUND

When a second line service ("SLS") provider offers a method for routing calls between an SLS subscriber's telecommunications device ("TD") and a third party's TD, the method may involve using a common relationship number associated to (1) the SLS number of the SLS subscriber, (2) the primary phone number (or any phone number from which the SLS subscriber can make/receive a call) and (3) the primary phone number of a third party (or any phone number from which the SLS subscriber can make/receive a call). In the typical SLS scenario, an SLS based call or communication is initiated from the TD of an SLS subscriber, and directed toward a particular third party or other final destination by the SLS subscriber entering or selecting the relationship number, directly or indirectly. These SLS based call or communications are routed to an SLS platform or server and then redirected by the SLS platform or server to a third party TD that is identified or associated with the relationship number. More specifically, the SLS leverages the relationship number such that the SLS call is routed to the SLS platform or server. At the SLS platform or server, the combination of the phone number associated with the subscriber TD used to initiate the SLS based call, and the relationship number identified in the SLS call, allows the SLS platform or server to identify the third party or the ultimate destination number. The SLS platform is then able to route the SLS based call to the third party number for call completion.

Unfortunately, it is not always possible for an SLS platform to determine the phone number associated with the subscriber TD used to initiate the SLS based call. In certain circumstances the call signal channeled through the telecommunications network handling the call or communication may not include sufficient information, such as the calling line identification ("CLID") or any other data necessary to identify the phone number associated with the TD initiating the SLS based call. This missing CLID data may be the result of the telecommunication network, or its associated elements, not making the information available, not making the information reliably available, not making the information consistently available, etc. For example, when an SLS subscriber is roaming to a telecommunications network different from its primary, or "home," telecommunications network, the CLID may not be available.

Regardless of what causes the CLID to be missing, the SLS platform or server cannot identify the third party or destination number at which to terminate the SLS based call if it does not have the subscriber TD's CLID. Accordingly, what is needed is a system and method for providing an SLS to a subscriber TD when the subscriber TD's CLID is missing.

SUMMARY OF THE DISCLOSURE

A method and system are described for servicing an SLS based communication request originating from a subscriber's TD even if the call signal does not include sufficient information to identify the phone number from which the subscriber initiated the request. Such embodiments will be referred to as CLID agnostic SLS systems.

In general, the operation of various embodiments that CLID based are first described to provide an overall understanding of the SLS. Following this, the operation of various embodiments that are CLID agnostic is presented. The embodiments in the CLD based system may operate in an environment in which an SLS platform is interposed between a network serving as the primary service provider to a subscriber's TD and a network serving as the primary service provider to a third party TD. As such, a call originating from a third party TD and directed towards the SLS number associated with the TD of an SLS subscriber, is routed by the receiving network to an SLS platform or server for processing.

Upon receiving the call, the SLS platform queries a local database to identify a relationship number that serves to map the primary number of the subscriber's TD to the combination of the third party calling number and the subscriber's second line number. The call is then redirected to the primary number of the subscriber's TD along with or in addition to, information that identifies the call as being directed to the SLS number. Once received by the subscriber's TD, the call setup is completed. Additional information may be included within the call signal such that an application running, associated with or resident on the subscriber's TD can save the combination in a local database on the subscriber's TD.

Advantageously, the relationship number so delivered to the subscriber's TD can be used at a later time to initiate an SLS based call to a third party. As a non-limiting example, dialing the third party's telephone number or otherwise initiating a call to the third party from the SLS application on the subscriber's TD can result in dialing or initiating a call to the relationship number for the third party. As such, when the call enters the telephone network (such as the PSTN, MTSO, etc.) the call is actually routed to the SLS platform. The SLS platform may then use the relationship number to identify the actual destination number of the third party and the SLS number that is attributed to being the originator of the call. Next, the SLS platform routes, bridges, transfers, initiates or otherwise establishes a completed communication path, or the delivery of a message from the originating TD to the destination TD. As a non-limiting example, using the actual third party called number, the SLS platform may complete the second leg of the call. In certain embodiments, a call leg between a subscriber's TD and the SLS platform may be completed using a session initiated protocol ("SIP") so that the data service provided by the primary service provider of the subscriber device is used in lieu of a voice channel.

However, if a subscriber TD attempts to direct an SLS based call to a third party number the does not have an associated relationship number, the call may be directed to, or invoke the routing of the call to the SLS platform by placing the call to a new relationship number selected by an SLS client application running on the subscriber's TD. In such case, the relationship number invokes the telecommunications network to route the call to the SLS platform and the third party number is provided to the SLS platform from the subscriber's TD. In other embodiments, the new relationship number may be requested from the SLS platform before making the call and then used by the subscriber's TD to make the call. In either case, a new relationship number is used to direct the call from the subscriber's TD toward the third party destination and to trigger the telecommunications network to route the call to the SLS platform.

In the databases located at or accessible to the subscriber's TD and the SLS platform, the new relationship number maps the subscriber's primary number to the combination of the third party number and the subscriber's second line number. The call is redirected by the SLS platform to the number associated with the third party TD and the call is completed. Advantageously, the new relationship number can be used at a later time should the subscriber desire to call the third party as previously described.

By associating the SLS phone number of the subscriber, the primary number of the subscriber and the phone number of a third party via a common relationship number, SLS based calls can be directed to and from an SLS of a subscriber TD.

Understanding the general operation of the SLS, the specific CLID agnostic embodiments can now be better understood. In general, this aspect of the various embodiments utilizes a different type of relationship number than has been previously presented. The "Normal" relationship numbers, as presented above, may exist in a common pool used by multiple SLS subscribers. The translation of the specific information, e.g. which SLS phone number is calling and to which third party telephone number the second leg of the SLS should be directed, by the SLS platform requires two pieces of information from the call signal: the actual primary number associated with the subscriber TD and the relationship number.

Thus, a problem arises when the call signal from the subscriber's TD does not include sufficient information, such as CLID or any other data necessary to identify the phone number associated with the subscriber TD. For example, this problem may arise when a subscriber TD roams to a visited network where proper identification of the calling number is not available or not reliably or consistently included in the signaling. If the primary number is not properly transmitted in the signaling, the look-up based on the relationship number and originating number obviously cannot be performed.

In addressing this issue, the various CLID agnostic embodiments operate to create a pool of additional "special" relationship numbers. These special relationship numbers are used for one specific subscriber TD at a time. Through negotiation between the subscriber's TD and the SLS platform or server, the server will assign a special relationship number to that specific subscriber TD. These special relationship numbers can be used for multiple purposes, with the specific meaning established as part of the client-server negotiation.

The duration of the assignment of that special relationship number to a specific subscriber TD can be based on an event occurring, e.g. a call is placed, based on a timer, or durable until explicitly cancelled by the subscriber TD or by the SLS platform.

Because the special relationship number is assigned by the server to a known, specific subscriber TD, the SLS platform does not need the CLID, or any other data useful for identification of the phone number being used by and associated with subscriber TD. Instead, the SLS platform has assigned the specific special relationship number to that particular SLS subscriber and, furthermore, it can determine the third party to which the SLS based call is intended.

In some embodiments, the SLS platform may communicate with the subscriber TD that a special relationship number is needed because the subscriber is in a CLID agnostic system. Additionally, it is envisioned by this disclosure that the SLS platform may assign a special relationship number or request a special relationship number from the SLS platform for the third party phone number upon the occurrence of a query error for "Normal" relationship number methods and systems, upon a specific request by the SLS subscriber (either directly to the SLS provider, indirectly to the SLS provider using the SLS application, etc.), upon a specific triggering event, e.g., the roaming of the subscriber TD to a foreign communications network, etc.

In certain embodiments, regardless of how, when or for how long the special relationship number is assigned, the subscriber TD may eventually receive a communication from the SLS platform with the special relationship number assignment information. The SLS platform may then store the combination of the special relationship number and the third party phone number in the local SLS database.

In certain embodiments involving a query error, despite SLS platform's query error, the subscriber TD can establish a communication with the SLS platform using the special relationship number associated with the dialed third party number. The subscriber TD phone application may query its local SLS database and translates the intended third party number to yield the specific special relationship number. Having queried the special relationship number, the SLS phone app may place the call to the SLS platform from subscriber's primary phone number to the special relationship number.

When the SLS platform determines that this call was received at the specific special relationship number, it recognizes that the calling party is the SLS subscriber despite the CLID agnostic circumstances. As a result, the SLS platform does not need to query a "Normal" relationship number. Instead, the SLS platform queries using the following logic: "a call was received at a specific special relationship number, so this means that the SLS subscriber is wanting to call an associated third party phone number using its SLS phone number." The SLS platform may then follow that logic and complete a second call by calling the third party number using the SLS number.

BRIEF DESCRIPTION OF THE DRAWINGS

In the figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral encompass all parts having the same reference numeral in all figures.

FIGS. 3A-3D are exemplary data tables that may be leveraged by a redirection module of an SLS platform and an SLS module of a subscriber TD to provide a second line service to a user of subscriber TD.

DETAILED DESCRIPTION

Figure 1:
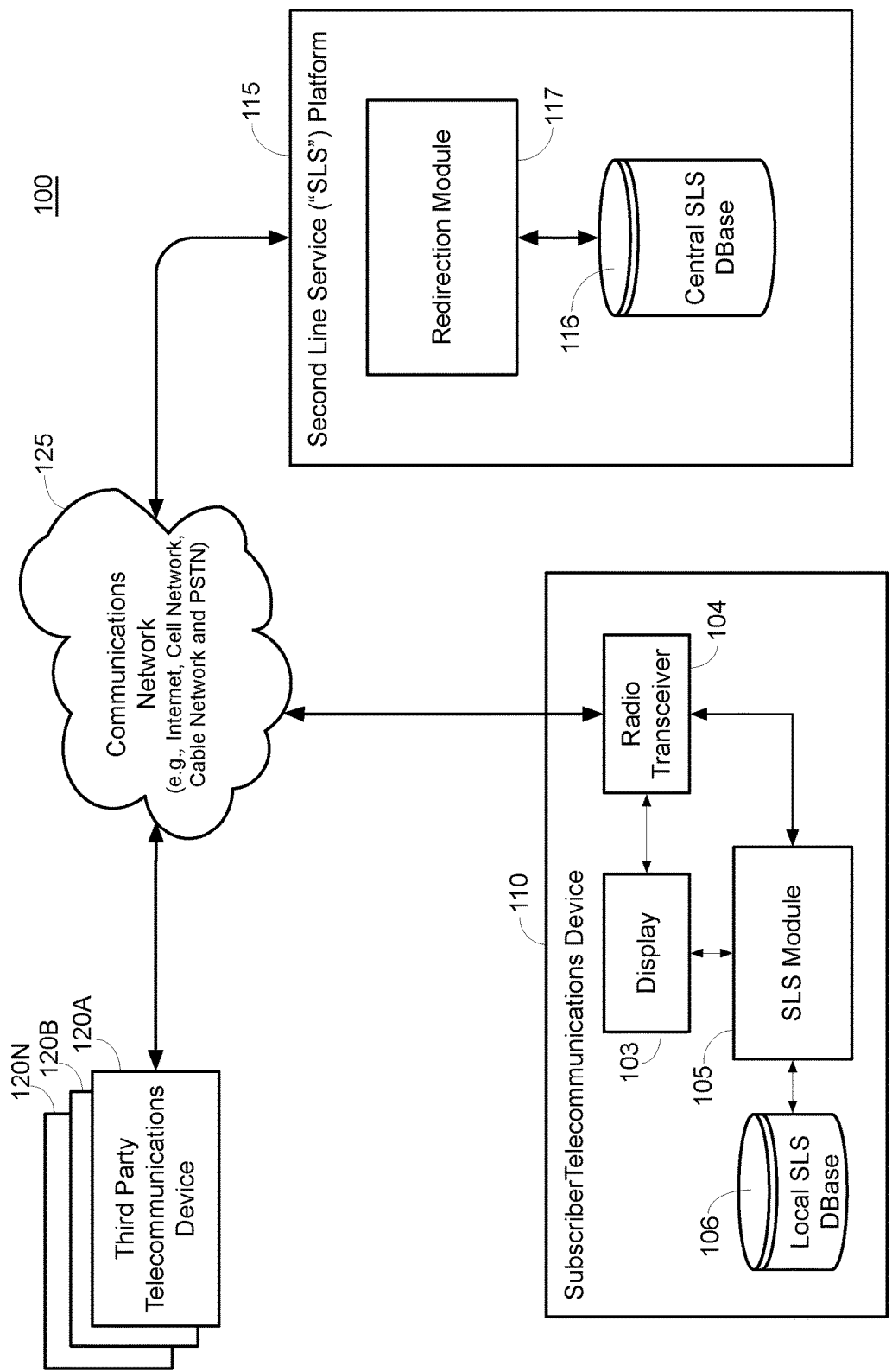
FIG. 1 is a high level diagram illustrating exemplary components of a system for providing an SLS to a subscriber TD 110.

The word "exemplary" is used herein to mean "serving as an example, instance, or illustration." Any aspect described herein as "exemplary" is not necessarily to be construed as preferred or advantageous over other aspects.

In this description, the terms "application" and "app" may also include files having executable content, such as: object code, scripts, byte code, markup language files, and patches. In addition, an "application" referred to herein, may also include files that are not executable in nature, such as documents that may need to be opened or other data files that need to be accessed. Further, an "application" may be a complete program, a module, a routine, a library function, a driver, etc.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component.

One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets, e.g., data from one component interacting with another component in a local system, distributed system, and/or across a network such as the Internet with other systems by way of the signal).

In this description, the terms "telecommunications device," "communication device," "wireless device," "wireless telephone," "wireless communication device" and "wireless handset" are used interchangeably. With the advent of third generation ("3G") and fourth generation ("4G") wireless technology, greater bandwidth availability has enabled more portable computing devices with a greater variety of wireless capabilities. Therefore, a telecommunications device ("TD") may include a cellular telephone, a pager, a PDA, a smartphone, a navigation device, a tablet personal computer ("PC"), or a hand-held computer with a wireless connection or link.

In this description, the terms "call" and "communication," in their noun forms, envision any data transmission routed across a network from one device to another including, but not limited to, a voice transmission, a text message, a video message, a page, a data transmission, etc.

FIG. 1 is a high level diagram illustrating exemplary components of a system 100 for providing an SLS to a subscriber TD 110. In general, an SLS based call can be originated by a subscriber TD 110 and directed toward a non-subscriber or subscriber third party TD 120 or be originated by a non-subscriber or a subscriber third party TD 120 and directed towards a subscriber TD 110. The typical subscriber TD 110 is associated with a primary phone number assigned to it and provisioned and serviced by the subscriber's home mobile service provider ("primary service provider") as is understood by one of ordinary skill in the art. A subscriber to an SLS offered through exemplary system 100 may receive calls at the subscriber TD 110 that are originally directed to either of the primary phone number provided by the primary service provider or the secondary phone number ("SLS phone number") provided, serviced and or facilitated by the SLS platform 115. It will also be appreciated that in some embodiments, the subscriber TD 110 may only include SLS operation and not include a primary number at all. In such embodiments, any communication between the TD 110 and the servicing network would occur over a data channel rather than a voice channel. In such embodiments, the TD 110 could actually be a computer device connected to the Internet. Yet in other embodiments, the TD 110 may include a minimalized primary number service that is greatly restricted. For instance, minimal mobile service only includes the ability to make a 911 emergency call. In some embodiments, one step above such limitation may be provided to the TD 110 such that the TD 110 can only operate to exchange sufficient information with the network to establish an SLS call.

Notably, depending on the particular embodiment, the primary service provider and the SLS platform, i.e., the second line service provider, may be the same provider or different providers. In embodiments where the primary service provider and the second line service provider are different providers, the SLS subscriber may receive separate billing records from each provider. However, it is envisioned that certain embodiments where the primary service provider and the second line service provider are not one and the same may take advantage of session initiated protocols ("SIP") to simplify billing records for the user.

In general, any call directed to either of the primary phone number or the SLS phone number are transmitted from a third party TD 120 to the subscriber TD 110 by way of communications network 125. Notably, communications network 125 envisions any and all networks for transmitting and terminating communications between TDs such as, but not limited to, cellular networks, PSTNs, cable networks and the Internet. Methods for effecting the transmission of data across communications network 125 from one device to another, including call setups, terminations and the like are understood by those of ordinary skill in the art of data transmission and may include the use of protocols and standards such as, but not limited to, signaling system seven ("SS7") protocol suite, SIP, customized applications for mobile networks enhanced logic ("CAMEL") or CAMEL Application Part ("CAP"), remote operations service element ("ROSE"), Voice Over IP ("VOIP"), proprietary techniques, etc. Notably, while the use of any particular protocol or communications standard may be a novel aspect of a particular embodiment of the systems and methods, it will be understood that the scope of the systems and methods disclosed herein is not limited to the use of any particular protocol or combination of protocols.

A call made from a third party TD 120 to the primary number associated with subscriber TD 110 is transmitted across communications network 125 and routed to subscriber TD 110, as is understood in the art. The radio transceiver 104, if the TD 110 is a portable and wireless device, enables the receipt and transmission of signals to and from subscriber TD 110. The call signal may include the calling line identification ("CLID"), i.e., the phone number being used by and associated with third party TD 120 for the call, such that when the call is received at subscriber TD 110 the CLID may be displayed for the benefit of the SLS subscriber on display component 103. It is envisioned by this disclosure that in certain circumstances the call signal may not include the CLID or any other data useful for identification of the phone number being used by and associated with the call-originating TD. It is known by those of ordinary skill in the art that this missing data may be the result of communications network 125 (and the associated elements such as third party TD 120, subscriber TD 110, SLS platform 115 or the like) not making the information available, not making the information reliably available, not making the information consistently available, etc.

The various embodiments of the SLS system and method described in the present disclosure provide the SLS even if the CLID or other identifying information of the subscriber TD 110 is not available at the time of setting up a call by the subscriber TD 110. Such a scenario can occur when the subscriber, or the TD 110 of the subscriber, is being operated in a roaming manner. The various embodiments of the CLID agnostic SLS described in the present disclosure are mainly focused on the situation in which a call is originated by a subscriber TD 110.

Notably, although the exemplary embodiments described in the present disclosure use the CLID as an example of data that may be displayed for the benefit of the user of a subscriber TD 110, it will be understood that any data associated with the third party TD 120, subscriber TD 110, SLS platform 115 or the like may be rendered for the benefit of the user of the system 100 and, as such, only describing that the CLID is displayed will not limit the scope of what is envisioned by the disclosure. Moreover, it is envisioned that any data uniquely associated with a call to a primary number or an SLS phone number may be displayed for the benefit of a SLS subscriber to the system 100.

Returning to the FIG. 1 illustration, a call made from a third party TD 120 to an SLS phone number associated with subscriber TD 110 is transmitted across communications network 125. As one of ordinary skill in the art will understand, the communications network 125 routes the call based on the dialed SLS phone number and routes the call to SLS platform 115. This is the first leg of the SLS. The SLS platform 115 thus effectively intercepts or receives the call, determines that the call was intended for subscriber TD 110 and then takes actions such that the call can be terminated at the subscriber TD 110. This is the second leg of the SLS. In this way, while a call directed to a primary number associated with subscriber TD 110 is routed directly to subscriber TD 110, a call directed to a second line number associated with subscriber TD 110 is routed to the SLS platform 115 instead.

Once the call is received at SLS platform 115, a query of central SLS database 116 by redirection module 117 determines that the call from third party TD 120 was meant for the second line number associated with subscriber TD 110. Once the determination is made, redirection module 117 processes the call and performs additional network functions such that the call is made available for termination at subscriber TD 110 through its SLS.

Because the call may include data identifying it as a call to the SLS phone number (one of multiple possible network functions performed by redirection module 117 and/or other SLS platform 115 components) associated with subscriber TD 110, the SLS module 105 intercepts the incoming call, or otherwise injects itself into the call processing activity for the call, and then leverages data stored in the local SLS database 106 to render it in such a way that subscriber TD 110 processes or recognizes the call as an SLS call as opposed to a call directed at its primary phone number. For instance, the SLS module 105 is designed to work with radio transceiver 104 and any stored or retrievable content in local SLS database 106 to terminate a call to an SLS phone number, render associated data and provide services uniquely associated with the SLS phone number such as, but not limited to, dedicated voicemail, ringtones, caller ID, automated responses, etc.

It is envisioned by this disclosure that in certain circumstances, the SLS platform 115 may not be able to determine the identity of the third party TD 120 (for the reasons stated above), and thus, a query of central SLS database 116 by redirection module 117 using the phone number associated with third party TD 120 for the call may be impossible. Nonetheless, under these circumstances, the SLS platform 115 has a process for effectively intercepting the call, determining that the call was intended for subscriber TD 110, and then taking actions such that the call can be terminated at the subscriber TD 110.

A more detailed description of the exemplary method, including exemplary methods for (1) receiving a call from a third party TD 120, (2) making a call to a third party TD 120 and (3) performing (2) when the call signal from the subscriber TD 110 does not include the CLID or any other data useful for identification of the phone number being used by and associated with the calling TD, by way of the SLS platform 115 will be described below relative to FIG. 4.

Figure 2:
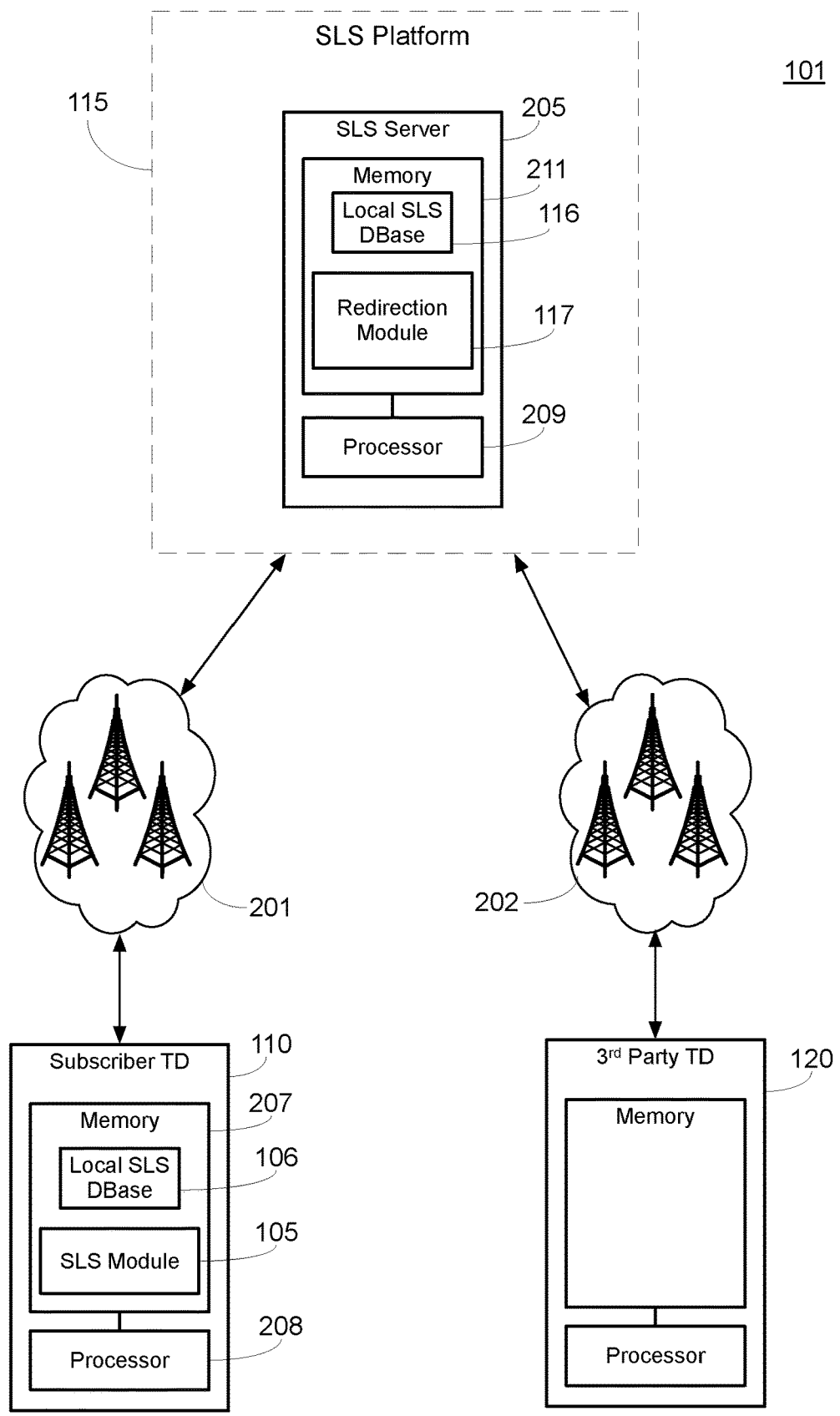
FIG. 2 is a diagram of an exemplary network architecture for the system of FIG. 1.

Referring to FIG. 2, a diagram of exemplary network architecture 101 for the system 100 of FIG. 1 is depicted. The exemplary network architecture 101 may include a subscriber TD 110 and a third party TD 120. Notably, although the third party TD 120 is not illustrated to suggest that it is equipped with SLS capability, it is envisioned that in some embodiments both the subscriber TD 110 and the third party TD 120 may be SLS enabled.

As illustrated in FIG. 2, an SLS platform 115 may be connected to the subscriber TD 110 via a first provider network 201 and to the third party TD 120 via a second provider network 202, although it is envisioned that TDs 110 and 120 may be associated with a common service provider in some embodiments. One of ordinary skill in the art would recognize that communications network 125 from FIG. 1 can be comprised of smaller networks like first provider network 201 and second provider network 202.

It is envisioned that the first provider network 201 and the second provider network 202 can be the same network. Additionally, it is envisioned that the first provider network 201 and the second provider network can be operated, serviced, owned, etc. by the same or different service provider(s), and it is envisioned that either, or both, service providers respectively associated with provider networks 201 or 202 may function as both a primary service provider and/or an SLS provider for a given subscriber TD 110 or third party TD 120. Furthermore, it is envisioned that either or both of subscriber TD 110 and third party TD 120 may be associated with a primary service provider and a separate SLS provider.

Notably, depending on the particular embodiment, first provider network 201 or second provider network 202 may not make the CLID, or other data useful for identification of the phone number being used by and associated with the calling TD, available, may not make the information reliably available, may not make the information consistently available, etc.

For exemplary purposes, the subscriber TD 110 is depicted as being SLS enabled and the third party TD 120 is depicted as not having a second line service associated with it. Moreover, first provider network 201 and the second provider network 202 are the same network in FIG. 2. Finally, first provider network 201 and the second provider network 202 are depicted as networks that, at certain times and under certain circumstances, may not make the CLID, or other data useful for identification of the phone number being used by and associated with the calling TD, available, reliably available, consistently available, etc. Despite what is depicted for exemplary purposes, other combinations of primary and secondary service provider networks connecting SLS platform 115 to subscriber TD 110 and third party TD 120 are envisioned.

In FIG. 2, it can be seen that the SLS platform 115 may include an SLS server 205 configured to receive calls directed to and from an SLS phone number associated with subscriber TD 110. The SLS server 205 includes a processor 209 and a memory 211 coupled to the processor 209. For some embodiments, the memory 211 may include instructions for executing one or more of the method steps described herein. Further, the processor 209 and the memory 211 may serve as a means for executing one or more of the method steps described herein. As indicated, the memory 211 may also include a redirection module 117 and a central SLS database 116. Notably, it should be understood that the term server 205 may refer to a single server system or multiple systems or multiple servers. One of ordinary skill in the art will appreciate that the various server arrangements may be selected depending upon computer architecture design constraints without departing from the scope of the invention.

As further illustrated in FIG. 2, the subscriber TD 110 may include a processor 208 and a memory 207 coupled to the processor 208. For some embodiments, the memory 207 may include instructions for executing one or more of the method steps described herein. Further, the processor 208 and the memory 207 may serve as a means for executing one or more of the method steps described herein. As indicated, the memory 207 may also include an SLS module 105 and a local SLS database 106.

Illustrative embodiments for providing an SLS to an SLS subscriber are described in the context of the system and network architecture described in FIGS. 1-2 and the exemplary data tables reflected in FIGS. 3A-3D. Specifically, three different embodiments are described: one embodiment describes receiving a call through an SLS from a third party TD 120 when the call signal includes the CLID or any other data useful for identification of the phone number being used by and associated with the calling TD; the second embodiment describes making a call through an SLS to a third party TD 120 when the call signal includes the CLID or any other data useful for identification of the phone number being used by and associated with the calling TD; the third embodiment describes the second embodiment when the call signal does not include the CLID or any other data useful for identification of the phone number being used by and associated with the calling TD.

As previously stated, FIG. 1 illustrates a call made from a third party TD 120 to an SLS phone number associated with subscriber TD 110. As one of ordinary skill in the art will recall, the communications network 125 routes the call based on the called number (the SLS phone number associated with the SLS subscriber). Ultimately, communications network 125 routes the call to SLS platform 115. SLS platform 115 effectively intercepts the call, determines that the call was intended for subscriber TD 110 and then takes actions using "relationship numbers" such that the call can be terminated at the subscriber TD 110. Consequently, all the illustrative embodiments of the method involve leveraging two sets of intermediate phone numbers, one set of intermediate phone numbers for one leg of the SLS and the other for the second leg of the SLS, such that calls directed to subscriber TD 110 ultimately terminate at TD 110 using the SLS.

FIGS. 3A-3D are exemplary data tables that may be leveraged by a redirection module 117 of an SLS platform 115 and an SLS module 105 of a subscriber TD 110 to provide a second line service to a user of subscriber TD 110. The Second Line Service Master ID Table 305 and Subscriber Relationship ID Table 310 of FIG. 3A are stored in a central SLS database 116 while the exemplary Subscriber Relationship ID Table 315 of FIG. 3B are stored in a local SLS database 106 of a subscriber TD 110. Likewise, the Second Line Service Master ID Table 305 and Subscriber Special Relationship ID Table 320 of FIG. 3C are stored in a central SLS database 116 while the exemplary Subscriber Special Relationship ID Table 325 of FIG. 3D are stored in a local SLS database 106 of a subscriber TD 110. As such, some illustrative embodiments involve leveraging two sets of intermediate phone numbers, the phone numbers related to the Second Line Service Master ID Table 305 and the phone numbers related to the Subscriber Relationship ID Tables. Other illustrative embodiments involve leveraging two sets of intermediate phone numbers, the phone numbers related to the Second Line Service Master ID Table 305 and the phone numbers related to the Subscriber Special Relationship ID Tables. Notably, it is envisioned that in some illustrative embodiments three sets of intermediate phone numbers may be involved even though only two sets of intermediate phone numbers are actually leveraged for the first and second leg of the SLS.

With regard to the first embodiment and to the leveraging of the first set of intermediate phone numbers, specifically the phone numbers related to the Second Line Service Master ID Table 305, once the call reaches the SLS platform 115, an application running on redirection module 117 makes a translation to complete this first leg of the SLS. The SLS platform 115 maintains a master list of SLS phone numbers that are in service. In some embodiments, the SLS provider may be the owner, lessee, or assignee, etc. of these SLS phone numbers.

In the communications network 125, these SLS phone numbers route to the SLS platform 115, i.e., the SLS platform may be communicatively coupled with communications network 125, and any of its component networks like first provider network 201 or second provider network 202, such that a call directed at the SLS phone number is ultimately routed to the SLS platform. However, one of ordinary skill in the art will recognize that, depending on which provider network the SLS phone number is associated, a call directed at/directed from the SLS phone number is usually routed through its associated provider network before terminating at the SLS platform. For example, in FIG. 2, if the SLS phone number is associated with first provider network 201, then any call direct at/directed from the SLS phone number is routed through first provider network 201 regardless of the SLS phone number being owned, lease, or assigned, etc. by a separate SLS provider.

The SLS provider that manages the SLS platform 115 essentially has a group of SLS phone numbers in inventory, and the SLS provider assigns the SLS phone numbers to subscribers of the SLS. Regarding the SLS provider's inventory of SLS phone numbers, one of ordinary skill in the art will recognize that the SLS phone numbers may be random and generally unrelated to each other, i.e., although the exemplary SLS phone numbers depicted in the FIG. 3A Second Line Service Master ID Table are sequential, it is envisioned that such is not the case in all embodiments.

Moreover, one of ordinary skill in the art will recognize that, although the exemplary SLS phone numbers depicted in the FIG. 3A Second Line Service Master ID Table 305 include a specific country code, area code, and seven digit directory number, it is envisioned that any country code, area code and directory number system known to those skilled in the art is included within the scope of this disclosure. Additionally, it is envisioned that the SLS provider can maintain a large and diverse inventory of SLS phone numbers; each being associated with its respective provider network and, consequently, each routing through its associated provider network before terminating at the SLS platform 115.

Referring back to FIGS. 3A-3B and the Second Line Service Master ID Table 305, the example Subscriber #1 has been issued SLS phone number 1.770.555.0001. Other SLS subscribers in different situations and with different circumstances are within the scope of this disclosure. Subscriber #1 may choose to give out its SLS phone number to any of its contacts.

With regard to the first embodiment and to the leveraging of the second set of intermediate phone numbers, specifically the phone numbers related to the Subscriber Relationship ID Tables, for each SLS subscriber a Subscriber Relationship ID Table 310 is also maintained. Referring to the Subscriber Relationship ID Table 310, the SLS provider has another list of dialable phone numbers, i.e., relationship numbers, which are maintained. These relationship numbers are essentially "hidden numbers" that are used to make the second leg of the call between the subscriber TD 110 and the SLS platform 115.

In some embodiments, the SLS provider may be the owner, lessee, or assignee, etc. of these relationship numbers. Like the SLS phone numbers, one of ordinary skill in the art will recognize that, depending on which provider network the relationship numbers are associated, a call directed at/directed from the relationship numbers are usually also routed through their associated provider network. For example, in FIG. 2, if the relationship numbers are associated with first provider network 201/second provider network 202, then any call directed at/directed from the relationship numbers is routed through first provider network 201/second provider network 202 regardless of the relationship number being owned, leased, or assigned, etc., by an SLS provider.

Concerning the Subscriber Relationship ID Table 310, one of ordinary skill in the art will understand that certain embodiments may not formally distinguish one SLS subscriber's records from that of another via individual subscriber relationship ID tables. Rather, as is understood in the art of database management and query, a more general relational database including records associated with multiple SLS subscribers may be used to map SLS subscriber number and third party number combinations to given relationship numbers. As such, it will be understood by one of ordinary skill in the art that the description in this disclosure of exemplary embodiments that include individual subscriber relationship ID tables are offered for illustrative purposes only and will not limit the scope of the disclosure.

Additionally, concerning the use of relationship numbers, it is envisioned that certain relationship numbers may be used for a plurality of SLS phone numbers and third party number combinations, i.e., in certain embodiments a given relationship number may not be unique to a given subscriber phone number and third party phone number combination. For example, in an illustrative embodiment, SLS subscribers D, E, F and G, may all have database records that map relationship number X to third party numbers J, K, L and E, respectively. Notably, in this exemplary scenario, the subscriber phone number and third party number combination G:E is meant to envision a case where G has a calling relationship with E. In such case, although E is a subscriber to the SLS it may also be treated as a third party caller relative to SLS subscriber G. To carry the example further, if G has a relationship with E, E also has one with G. However, the E:G combination may or may not use a different relationship number, such as Y.

Additionally, it is envisioned that in certain embodiments a relationship number may be used for purposes other than to map a third party calling number in Subscriber Relationship ID Table 310. For example, a given relationship number may be used by the SLS platform 115 to alert the SLS Module 105 that a call has been received from an unknown caller with a blocked CLID. Or, as another non-limiting example, a given relationship may be used by the SLS platform 115 to alert the SLS Module 105 that a voice message has been deposited for the SLS subscriber.

Like the SLS phone numbers, the SLS provider essentially has a group of relationship numbers in inventory, and the SLS provider assigns the relationship numbers as described above, and as described in greater detail below. Regarding the SLS provider's inventory of relationship numbers, one of ordinary skill in the art will recognize that the relationship numbers may be random and generally unrelated to each other, i.e., although the exemplary relationship numbers depicted in the FIG. 3A-3B Subscriber Relationship ID Tables are sequential, it is envisioned that such is not the case in all embodiments.

Moreover, one of ordinary skill in the art will recognize that, although the exemplary relationship numbers depicted in the FIG. 3A-3B Subscriber Relationship ID Tables include a specific country code, area code, and seven digit directory number, it is envisioned that any country code, area code and directory number system known to those skilled in the art is included within the scope of this disclosure. Additionally, it is envisioned that the SLS provider can maintain a large and diverse inventory of relationship numbers; each being associated with its respective provider network and, consequently, each routing through its associated provider network when leveraged by the SLS.

Referring again to FIGS. 3A-3B and the Subscriber Relationship ID Tables, the example third parties with numbers 1.305.229.9999, 1.212.777.8888 and 1.408.333.2222 have been issued relationship numbers 1.678.222.0001, 1.678.222.0002 and 1.678.222.0003 respectively. Other third parties in different situations and with different circumstances are within the scope of this disclosure.

As mentioned above, the relationship numbers are "behind the scenes" numbers that may be hidden from the SLS subscriber and any third party calling the SLS subscriber through the SLS. This is accomplished by an app running on SLS module 105 residing on subscriber TD 110. In this first illustrative embodiment, the SLS platform 115 has effectively intercepted the first leg of the SLS and determined that the call was intended for subscriber TD 110 (this was described above). As will be described in greater detail below, SLS platform 115 takes an action that involves the relationship number such that the call can be terminated at the subscriber TD 110. Essentially, by leveraging the relationship number, an SLS provider may insert itself into the middle of a call between a third party TD 120 and a subscriber TD 110.

Returning to the FIG. 3A-3B and the first illustrative embodiment, Subscriber #1 associated with subscriber TD 110 already has mobile phone service via its primary service provider using mobile phone number 1.408.544.1212. Subscriber #1 subscribes to an SLS provided by way of SLS platform 115 and is assigned SLS phone number 1.770.555.0001. A third party, identified in Subscriber Relationship ID Table 310 of FIG. 3A as being Subscriber Contact #1,is associated with a third party TD 120A having a primary phone number 1.305.229.9999. Notably, although the primary phone number 1.305.229.9999 associated with third party TD 120 is described herein as a primary phone number, it will be understood that it may, in fact, be a second line number in embodiments where the third party is also an SLS subscriber.

The third party uses TD 120 to place a call to the Subscriber #1's SLS phone number 1.770.555.0001. As described above, the call is routed to the SLS platform 115. The SLS platform 115 accepts the call and determines that the call is for SLS phone number 1.770.555.0001 and that 1.770.555.0001 requires a "relationship" set up for 1.305.229.9999. For purposes of these exemplary embodiments, Subscriber #1 has only recently subscribed to the SLS and Subscriber Relationship ID Table 310 does not yet contain any records, i.e., the third party associated with TD 120 is the first to place a call to the SLS phone number of Subscriber #1.

The SLS platform 115 creates the following relationship in Subscriber Relationship ID Table 310: When 1.770.555.0001 receives (or places) a call from/to 1.305.229.9999, the interaction with the subscriber TD 110 (having primary phone number 1.408.544.1212) will use dialable relationship number 1.678.222.0001. This relationship number was selected because it is a relationship number available in inventory to the SLS subscriber and the third party. Notably, it is envisioned that a given relationship number, such as relationship number 1.678.222.0001 in the present example, may be used as a relationship number for many different SLS subscribers as it is the combination of the SLS subscriber's primary number and/or the SLS phone number and the relationship number that map to the external number (in this case, 1.305.229.2999).

Now that the relationship number 1.678.222.0001 has been established in connection with Subscriber #1 and the calling third party, the SLS platform 115 may proceed to establish the second leg of the SLS—the call from the SLS platform 115 to the subscribers TD 110. The SLS platform 115 places the call to the subscriber TD 110. It is known to those with ordinary skill in the art that methods for establishing this second leg of the SLS include the use of protocols and standards such as, but not limited to, SS7 protocol suite, SIP, CAMEL or CAP, ROSE, VOIP, etc. It is of course possible for the SLS platform 115 to direct the call to the primary number 1.408.544.1212 of the subscriber TD 110 using standard voice channels.

Returning to the first illustrative embodiment, the CLID field for the call placed from SLS platform 115 to subscriber TD 110 may contain a specially encoded message for the SLS phone app running on SLS module 105. In some embodiments, this CLID field may contain the relationship number established by the SLS platform 115 (in this example, 1.678.222.0001) and the actual primary number of the calling third party (in this example, 1.305.229.9999), separated by a dialable separator such as a "star" character. In other embodiments, this CLID field may be populated with "unknown caller" or the like in the event that the relationship number is a new number assigned by the SLS platform 115 and not yet recognized by the SLS phone app (more details regarding such an embodiment is described below relative to FIGS. 4 and 5). Notably, it is envisioned that other embodiments may populate this CLID field, or provide other metadata, that serves to trigger recognition of the incoming call as a call directed to the SLS phone number of the SLS subscriber. As such, by describing the exemplary embodiment to populate this CLID field with a combination of the relationship number and the third party's actual phone number, the scope of the disclosure will not be limited.

Having recognized that the incoming call is from the SLS platform 115, the SLS module 105 stores the combination of the relationship number 1.678.222.0001 and the phone number being used by the third party 1.305.229.9999 in the local SLS database 106. To complete the exemplary call, the SLS module 105 may cause the actual phone number associated with the third party TD 120, 1.305.229.9999, to be rendered on display component 103 as an identification of the calling party and rings the phone. Once the Subscriber #1 answers, the SLS platform 115 connects the two legs of the SLS (leg 1 represented by third party TD 120A to SLS platform 115 and leg 2 represented by SLS platform 115 to subscriber TD 110) by methods known and understood by those of ordinary skill in the art of telecommunications. As non-limiting examples, the calls can be connected via a forward or a bridge, as well as other technologies known to those with ordinary skill in the art. Notably, it is envision by this disclosure that the call could be routed through the intermediate SLS platform 115 as a way of enabling the SLS between the third party TD 120 and the subscriber TD 110.

Notably, in the example, the combination of the relationship number 1.678.222.0001 and the phone number being used by the third party 1.305.229.9999 is now stored in the central SLS database 116 at SLS platform 115 and also in the local SLS database 106 in subscriber TD 110. As one of ordinary skill in the art will recognize, the importance of the relationship number is that it may also provide a mechanism by which the SLS platform 115 may intercept SLS calls originating from subscriber TD 110 (in much the same way as the SLS phone number provides a mechanism by which the SLS platform may intercept SLS calls originating from the third party TD 120).

With regard to the second illustrative embodiment, suppose Subscriber #1 desires to initiate a call to the third party associated with 1.305.229.9999 from its SLS phone number 1.770.555.0001. Because the third party associated with 1.305.229.9999 had previously placed a call to the SLS phone number 1.770.555.0001, the relationship combination that maps Subscriber #1's SLS phone number 1.770.555.0001 and the third party phone number 1.305.229.9999 to relationship number 1.678.222.0001 is already stored in both the central SLS database 116 at SLS Platform 115 and the local SLS database 106 in subscriber TD 110.

To place calls from its SLS phone number, Subscriber #1 uses the SLS phone app of SLS module 105 as his dialer, as a non-limiting example of one potential embodiment. In the SLS dialer (not depicted in the FIGs), Subscriber #1 dials the third party phone number 1.305.229.9999, which is reflected in the Private Relationship ID Tables 310 and 315 as being associated with his Contact #1. The SLS module 105 queries Subscriber Relationship ID Table 315 in local SLS database 106 and translates the dialed third party number 1.305.229.9999 to relationship number 1.678.222.0001. The SLS module 105 may indicate to the SLS subscriber via display 103 that it is calling 1.305.229.9999, but instead it calls the relationship number 1.678.222.0001. By calling the relationship number associated with Contact #1, the communications network 125 routes the call to the SLS platform 115 instead of directly to third party TD 120.

When the SLS platform 115 processes this first leg of the SLS, it may recognize that the calling number is the SLS subscriber's primary number 1.408.544.1212 (which is associated with the subscriber's SLS phone number 1.770.555.0001) and the called number is the relationship number 1.678.222.0001. Querying the Subscriber Relationship ID Table 310 in central SLS database 116, the redirection module 117 may apply the following logic: "when primary number 1.408.544.1212 calls relationship number 1.678.222.0001, it is actually SLS phone number 770.555.0001 calling 1.305.229.9999." The SLS platform 115 may then follow that logic and complete the second leg of the SLS by calling the actual number 1.305.229.9999 associated with third party TD 120 using the SLS number 1.770.555.0001.

Notably, in completing the second leg of the SLS and connecting the two legs (in much the same way as described above for SLS calls originating from a third party), the SLS platform 115 may modify the CLID field displayed for the benefit of TD 120 to be something other than the SLS phone number 1.770.555.0001 from which the second leg of the SLS is made. As a non-limiting example, it is envisioned that the SLS platform 115 may modify the CLID field to be the primary number of subscriber TD 110.

As described above, it is envisioned that another SLS subscriber (for example, Subscriber #2 having SLS phone number 1.770.555.0002) could also initiate the first leg of an SLS call by using the relationship number 1.678.222.0001. In this situation, the SLS platform 115 would direct the second leg of the SLS to a different third party number associated with a contact of Subscriber #2. As is described above, the encoded third party phone number called by the SLS platform 115 for the second leg of the call is derived from the combination of the SLS phone number and the relationship number.

With regard to the third embodiment (the third embodiment describes the second embodiment when the call signal of the first leg does not include the CLID or any other data useful for identification of the phone number being used by and associated with the calling TD), suppose Subscriber #1 desires to initiate a call to the third party associated with 1.305.229.9999, third party TD 120A, from its SLS phone number 1.770.555.0001. Notably, although the primary phone number 1.305.229.9999 associated with third party TD 120 is described herein as a primary phone number, it will be understood that it may, in fact, be a second line number in embodiments where the third party is also an SLS subscriber.

Returning to FIG. 3A-3B and the third illustrative embodiment, Subscriber #1 places a call to the third party's primary phone number 1.305.229.9999. To place calls from its SLS phone number, Subscriber #1 uses the SLS phone app of SLS module 105 as his dialer, as a non-limiting example of one potential embodiment. In the SLS dialer (not depicted in the FIGs), Subscriber #1 dials the third party phone number 1.305.229.9999, which is reflected in the Private Relationship ID Tables 310 and 315 as being associated with his Contact #1. The SLS module 105 queries Subscriber Relationship ID Table 315 in local SLS database 106 using the following logic: subscriber TD 110 wants to place a call through its SLS to 1.305.229.9999; because 1.305.229.9999 had previously placed a call to the SLS phone number 1.770.555.0001, the relationship combination maps Subscriber #1's SLS phone number 1.770.555.0001 and the third party phone number 1.305.229.9999 to relationship number 1.678.222.0001.

Having queried the relationship number, the SLS module 105 places the first leg of the SLS from subscriber's primary phone number 1.408.544.1212 to relationship number 1.678.222.0001. Notably, it is envisioned that SLS module 105 can place the first leg using protocols and standards such as, but not limited to SIP, CAMEL or CAP, ROSE, VOIP, etc. Moreover, it is envisioned that SLS module 105 can places the first leg from any telephone number associated with the TD that can make calls through communications network 125. The SLS module 105 may indicate to the SLS subscriber via display 103 that it is calling 1.305.229.9999, but instead it calls the relationship number 1.678.222.0001. By calling the relationship number associated with Contact #1, the communications network 125 routes the call to the SLS platform 115 instead of directly to third party TD 120.

As described above, it is envisioned that another SLS subscriber (for example, Subscriber #2 having SLS phone number 1.770.555.0002) could also initiate the first leg of an SLS call by using the relationship number 1.678.222.0001. In this situation, the SLS platform 115 would direct the second leg of the SLS to a different third party number associated with a contact of Subscriber #2.

Returning to FIG. 3A-3B and the third illustrative embodiment, the SLS platform 115 accepts the first leg of the SLS. When the SLS platform 115 processes this first leg it does not recognize that the calling number is the SLS subscriber's primary number 1.408.544.1212 (which is associated with the subscriber's SLS phone number 1.770.555.0001) because communications network 125 does not make the CLID, or any other data useful for identification of the phone number being used by and associated with Subscriber #1's TD for the call, available, reliably available, or consistently available, etc.

When querying the Subscriber Relationship ID Table 310 in central SLS database 116, the redirection module 117 computes the following result: "because there is no calling party telephone number to query as associated with relationship number 1.678.222.0001, the redirection module 117 cannot determine which SLS phone number is calling and to which third party telephone number the second leg of the SLS should be directed." Consequently, the SLS platform 115 cannot complete the second leg of the SLS by calling 1.305.229.9999 using the SLS number 1.770.555.0001 even though the relationship number 1.678.222.0001 had been previously associated with Subscriber #1 and the calling third party and stored in Subscriber Relationship ID Table 310 in central SLS database 116.

To deal with these circumstances and ensure that the second leg of the SLS is completed, SLS platform 115 is capable of leveraging a third set of intermediate phone numbers, specifically the phone numbers related to the Subscriber Special Relationship ID Tables in FIG. 3C-3D. For certain third parties, to which the SLS subscriber wishes to direct an SLS call, a Subscriber Special Relationship ID Table 320 may be maintained on the central SLS database 116 of SLS platform 115. Like the relationship numbers of Subscriber Relationship ID Table 310, the SLS provider has another list of dialable phone numbers, i.e., special relationship numbers, which are maintained. These special relationship numbers may also be "hidden numbers" that are used to make the first leg of the call between the subscriber TD 110 and the SLS platform 115 when communications network 125 does not make the CLID, or any other data useful for identification of the phone number being used by and associated with subscriber TD 110 for the call, available, reliably available, or consistently available, etc.

In some embodiments, the SLS provider may be the owner, lessee, or assignee, etc. of these special relationship numbers. Like the SLS phone numbers and the relationship numbers, one of ordinary skill in the art will recognize that, depending on which provider network the relationship numbers are associated, a call directed at/directed from the relationship numbers are usually also routed through their associated provider network. For example, in FIG. 2, if the special relationship numbers are associated with first provider network 201/second provider network 202, then any call directed at/directed from the special relationship numbers is routed through first provider network 201/second provider network 202 regardless of the relationship number being owned, lease, or assigned, etc. by an SLS provider.

Concerning the Special Subscriber Relationship ID Table 320, one of ordinary skill in the art will understand that certain embodiments may not formally distinguish one SLS subscriber's records from that of another via individual subscriber special relationship ID tables. Rather, as is understood in the art of database management and query, a more general relational database including records associated with multiple SLS subscribers may be used to map SLS subscriber number and third party number combinations to given special relationship numbers. As such, it will be understood by one of ordinary skill in the art that the description in this disclosure of exemplary embodiments that include individual subscriber special relationship ID tables are offered for illustrative purposes only and will not limit the scope of the disclosure.

Additionally, concerning the use of special relationship numbers, it is envisioned that, unlike the relationship numbers, special relationship numbers may only be used for a specific SLS phone number and third party number combination, i.e., in certain embodiments a given special relationship number is unique to a given subscriber phone number and third party phone number combination. For example, in an illustrative embodiment, if there are four SLS subscribers, D, E, F and J, only D's database records may map special relationship number X to third party number J. Notably, in this exemplary scenario, the subscriber phone number and third party number combination DJ is meant to envision a case where D has a special calling relationship with J. In such case, although J is a subscriber to the SLS it may also be treated as a third party caller relative to SLS subscriber D. To carry the example further, if D has a special relationship with J, it is not the case that J also has a special relationship with D.

Additionally, it is envisioned that in certain embodiments a special relationship number may be used for purposes other than to map a third party calling number in Subscriber Special Relationship ID Table 320. For example, a given special relationship number may be used by the SLS platform 115 for multiple purposes, with the specific meaning established as part of the client-server negotiation.

Like the SLS phone numbers and the relationship numbers, the SLS provider essentially has a group of special relationship numbers in inventory, and the SLS provider assigns the special relationship numbers as described above, and as described in greater detail below. Regarding the SLS provider's inventory of special relationship numbers, one of ordinary skill in the art will recognize that the special relationship numbers may be random and generally unrelated to each other, i.e., although the exemplary relationship numbers depicted in the FIG. 3C-3D Subscriber Special Relationship ID Tables are sequential, it is envisioned that such is not the case in all embodiments.

Moreover, one of ordinary skill in the art will recognize that, although the exemplary special relationship numbers depicted in the FIG. 3C-3D Subscriber Special Relationship ID Tables include a specific country code, area code, and seven digit directory number, it is envisioned that any country code, area code and directory number system known to those skilled in the art is included within the scope of this disclosure. Additionally, it is envisioned that the SLS provider can maintain a large and diverse inventory of special relationship numbers; each being associated with its respective provider network and, consequently, each routing through its associated provider network when leveraged by the SLS.

Referring again to FIGS. 3C-3D and the Subscriber Special Relationship ID Tables, the example third parties with numbers 1.305.229.9999, 1.212.777.8888 and 1.408.333.2222 have been issued special relationship numbers 1.678.333.0001, 1.678.333.0002 and 1.678.333.0003. Other third parties in different situations and with different circumstances are within the scope of this disclosure. For example, it is envisioned by this disclosure that the special relationship numbers could have been previously assigned and stored in the necessary databases or, the number could have be assigned on the fly when an subscriber TD attempts to place a call to a third party from and SLS number but the CLID of the calling TD is not available.

As mentioned above, the special relationship numbers may be "behind the scenes" numbers that are hidden from the SLS subscriber and any third party receiving a call from the SLS subscriber through the SLS. In this third illustrative embodiment, SLS platform 115 has effectively intercepted the first leg of the SLS but is unable to determine that the call was intended for third party TD 120 (this was described above). As will be described in greater detail below, SLS platform 115 may take an action that involves the special relationship number such that the call can be terminated at third party TD 120. Essentially, by leveraging the special relationship number, an SLS provider may insert itself into the middle of a call between a third party TD 120 and a subscriber TD 110 even though communications network 125 does not make the CLID, or any other data useful for identification of the phone number being used by and associated with subscriber TD 110 for the first leg, available, reliably available, or consistently available, etc.

More specifically, when the SLS platform 115 receives a call to a specific special relationship number, the SLS platform 115 does not need the CLID, or any other data useful for identification of the phone number being used by and associated with subscriber TD 110 for the first leg. Instead, the SLS platform 115 has assigned the specific special relationship number to that particular SLS subscriber and, furthermore, it can determine the third party to which the second leg is the intended. It therefore has all of the necessary information to complete the second leg of the call.

Returning to the third illustrative embodiment, because the SLS platform 115 cannot complete the second leg of the SLS, the SLS platform 115 may communicate to the SLS module 105 on subscriber TD 110 that a query error has occurred. It is known to those with ordinary skill in the art that methods for communicating this query error may include the use of protocols and standards such as, but not limited to, SS7 protocol suite, SIP, CAMEL or CAP, ROSE, VOIP, etc. Notably, it is envisioned by this disclosure that the SLS platform 115 may also communicate to the SLS phone app running on SLS module 105 the special relationship number assigned or to be assigned to the third party phone number.

Additionally, it is envisioned by this disclosure that the SLS platform 115 may assign a special relationship number to the third party phone number upon the occurrence of a query error (such as occurred in the third illustrative embodiment), upon a specific request by the SLS subscriber (either directly to the SLS provider, indirectly to the SLS provider using the SLS application, etc.), upon a specific triggering event, e.g., the roaming of the subscriber TD 110 to a foreign communications network, etc. One of ordinary skill in the art will recognize that the SLS provider, the SLS platform 115, etc. can determine the location of an SLS subscriber through a variety of techniques. Non-limiting examples of these techniques include GPS location service on the TD, access to the geographic information of the network, direct communication with the SLS subscriber as to their immediate location, triangulation based on tower identifiers, etc.

Finally, it is envisioned by this disclosure that the duration of the assignment of the special relationship number to a third party phone number may depend on a variety of factors. As non-limiting examples, the duration of the assignment may be only until a specific event occurs (e.g. a single call or a set number of calls are placed to the special relationship number), based on a timer, or durable until explicitly cancelled by the SLS subscriber either directly or indirectly.

Returning to the third illustrative embodiment, regardless of how, when or for how long the special relationship number is assigned, the SLS module 105 may eventually receive a communication from the SLS platform with the special relationship number assignment information and it stores the combination of the special relationship number 1.678.333.0001 and the phone number being used by the third party 1.305.229.9999 in the local SLS database 106 in Subscriber Special Relationship ID Table 325. Notably, in the example, the combination of the special relationship number 1.678.333.0001 and the phone number being used by the third party 1.305.229.9999 is now stored in the central SLS database 116 at SLS platform 115 and also in the local SLS database 106 in subscriber TD 110. As one of ordinary skill in the art will recognize, the importance of the special relationship number is that it provides a mechanism by which the SLS platform 115 may intercept SLS calls originating from subscriber TD 110 and complete the second leg of the call to the third party TD 120 even when communications network 125 does not make the CLID, or any other data useful for identification of the phone number being used by and associated with subscriber TD 110 for the call, available, reliably available, or consistently available, etc.

Returning to the third illustrative embodiment, despite SLS platform 115's query error, SLS module 105 can reestablish the first leg of the SLS using the special relationship number associated with the third party. The SLS module 105 queries Subscriber Relationship ID Table 325 in local SLS database 106 and translates the intended third party number 1.305.229.9999, which is reflected in the Private Special Relationship ID Tables 320 and 325 as being associated with his Contact #1, to special relationship number 1.678.333.0001. Having queried the special relationship number, the SLS module 105 places the first leg of the SLS from subscriber's primary phone number 1.408.544.1212 to special relationship number 1.678.333.0001. Notably, it is envisioned that SLS module 105 can place the first leg using protocols and standards such as, but not limited to SIP, CAMEL or CAP, ROSE, VOIP, etc. Moreover, it is envisioned that SLS module 105 can place the first leg from any telephone number associated with the TD that can make calls through communications network 125. The SLS module 105 may indicate to the SLS subscriber via display 103 that it is calling 1.305.229.9999, but instead it calls the special relationship number 1.678.333.0001. By calling the special relationship number associated with Contact #1, the communications network 125 routes the call to the SLS platform 115 instead of directly to third party TD 120.

When the SLS platform 115 processes this first leg of the SLS at the special relationship number, it recognizes that the calling party is the SLS subscriber. As a result, the SLS platform 115 does not need to query the Subscriber Relationship ID Table 310 in central SLS database 116. Instead, the SLS platform 115 queries Subscriber Special Relationship ID Table 320 using the following logic: "a call was received to special relationship number 1.678.333.0001, so this means that primary number 1.408.544.1212 is wanting to call 1.305.229.9999 using its SLS phone number 770.555.0001." The SLS platform 115 may then follow that logic and complete the second leg of the SLS by calling the actual number 1.305.229.9999 associated with third party TD 120 using the SLS number 1.770.555.0001.

Notably, in completing the second leg of the SLS and connecting the two legs, the SLS platform 115 may modify the CLID field displayed for the benefit of TD 120 to be something other than the SLS phone number 1.770.555.0001 from which the second leg of the SLS is made. As a non-limiting example, it is envisioned that the SLS platform 115 may modify the CLID field to be the primary number of subscriber TD 110. One of ordinary skill in the art would understand that, unlike the relationship numbers, another SLS subscriber (for example, Subscriber #2 having SLS phone number 1.770.555.0002) could not initiate the first leg of an SLS call by using the special relationship number 1.678.333.0001 when the special relationship number is assigned to Subscriber #1. To complete the exemplary call, the SLS platform 115 connects the two legs of the SLS (leg 1 represented by subscriber TD 110 to SLS platform 115 and leg 2 represented by SLS platform 115 to third party TD 120A) by methods known and understood by those of ordinary skill in the art of telecommunications. As non-limiting examples, the calls can be connected via a forward or a bridge, as well as other technologies known to those with ordinary skill in the art. Notably, it is envision by this disclosure that the call could be routed through the intermediate SLS platform 115 as a way of enabling the SLS between the third party TD 120 and the subscriber TD 110. It should also be appreciated that rather than establishing a call, such as a circuit switched call or a packet switched call, the process may simply result in establishing a virtual data connection for the delivery of an SMS, MMS or text message or the like.

FIGS. 4A-4E collectively illustrate an exemplary method 400 for implementing an SLS call between a third party TD, such as third party TD 120 and a TD associated with an SLS subscriber, such as subscriber TD 110 when the call signal from the subscriber TD 110 does not include the CLID or any other data useful for identification of the phone number being used by and associated with subscriber TD 110 for the call. Accordingly, for the SLS embodiment of method 400 it is envisioned that the SLS platform 115 may be positioned to experience a query error when processing the first leg of the SLS because it is missing the information necessary to determine to which phone number the second leg of the SLS should be directed.

At block 402, a call is directed to and received by an SLS platform 115. Notably, the call is envisioned to be any communication over communications network 125 that is directed to SLS platform 115, regardless of whether such communication originates from a subscriber TD 110 or a third party TD 120. One of ordinary skill in the art will recognize that a communication may include the use of protocols and standards such as, but not limited to, SS7 protocol suite, SIP, CAMEL or CAP, ROSE, VOIP, etc.

Next, at decision block 404, the SLS platform 115 determines whether the call originated from a third party TD 120 directed to an SLS subscriber, i.e., whether a third party has dialed an SLS phone number associated with an active SLS subscriber. If the communication was not a call that originated from a third party TD 120, then the "no" branch is followed to block 432 of FIG. 4C. If the call did, in fact, originate from a third party TD 120, then the "yes" branch is followed to block 406. Notably, if a call is directed to the SLS platform 115, one of ordinary skill in the art will recognize that the communication was either a call to an SLS phone number (if dialed by a third party TD 120), a call to a relationship number (if originating from an SLS client of a subscriber TD 110), or a data communication originating from an SLS client of a subscriber TD 110 (not depicted in the figures).

At block 406, the SLS platform 115 queries central SLS database 116 for the phone number being used by third party TD 120 in association with the SLS phone number that caused the call to be routed to the SLS platform 115. If at decision block 408, the SLS platform 115 successfully queries the phone number being used by third party TD 120 and SLS phone number combination, then the "yes" branch is followed to block 422 of FIG. 4B. If the phone number being used by third party TD 120 and SLS phone number combination are not successfully queried, then the "no" branch is followed to block 410.

At block 410, the SLS platform 115 may associate a new relationship number with the phone number being used by third party TD 120 to make the call, the SLS subscriber's primary phone number and the subscriber's SLS phone number. At block 412, the central SLS database 116 is updated to include the newly created record—the phone number being used by third party TD 120 to make the call is listed as a contact of the SLS subscriber in the Subscriber Relationship ID Table 310. At block 414, a call is established between the SLS platform 115 and the subscriber TD 110. In some non-limiting embodiments of block 414, the SLS platform 115 initiates the call through the communication network 125's voice channel with the subscriber TD 110 by dialing its primary phone number from the relationship number of block 410. In other non-limiting embodiments of block 414, the subscriber's TD 110 initiates the call through the communication network 125's voice channel with the SLS platform 115 by dialing the relationship number of block 410 from the subscriber TD 110's primary phone number after receiving a data communication from the SLS platform 115 with information containing the relationship number of block 410 and instructions to initiate the call (again, one of ordinary skill in the art will recognize that a communication may include the use of protocols and standards such as, but not limited to, SS7 protocol suite, SIP, CAMEL or CAP, ROSE, VOIP, etc). In certain non-limiting embodiments of block 414, the SLS platform 115 may populate the CLID field of the call between it and the subscribers TD 110 with a combination of the newly assigned relationship number and the phone number being used by third party TD 120 to make the call.

At block 416, the local SLS database 106 updates to include the newly assigned relationship number in association with the phone number being used by third party TD 120 to make the call. At block 418, the phone number being used by third party TD 120 to make the call is displayed to the SLS subscriber and the SLS subscriber is alerted to the incoming call. Notably, it is envisioned that displaying the phone number being used by third party TD 120 to make the call may include rendering the CLID field itself, rendering a picture of the third party, rendering a name, etc. as is understood by those with ordinary skill in the art of graphical user displays and interfaces. At block 420, the call from block 402 is bridged with the call from block 414 resulting in an active call between third party TD 120 and subscriber TD 110. One of ordinary skill in the art will recognize that there are many systems and methods known and understood for bridging or connecting a plurality of separate calls (the legs of the SLS); consequently, this disclosure is not limited by the used example "bridged."

It is envisioned that the steps taken at block 418 of the method 400 may differ in some embodiments. For instance, when a third party TD 120's call to an SLS phone number is received at the SLS platform 115, and the phone number being used by third party TD 120 to make the call is not yet associated with a relationship number, the SLS platform 115 may assign a next relationship number as described relative to blocks 410-412 then establish a call with the subscriber TD 110 as described in 414. The SLS module 105 of the subscriber TD 110, having no record of the new relationship number in its local database 106, may display the calling number as "unknown caller" on the display of the subscriber TD 110. At the same time, the SLS module 105 may establish a data connection over communications network 125 with the SLS platform 115 for the purpose of acquiring the third party calling number associated with the new relationship number. Once the phone number being used by third party TD 120 to make the call is acquired, the SLS module 105 may update the local database 106 and change the display from "unknown caller" to the phone number being used by third party TD 120 to make the call.

Figure 4A:
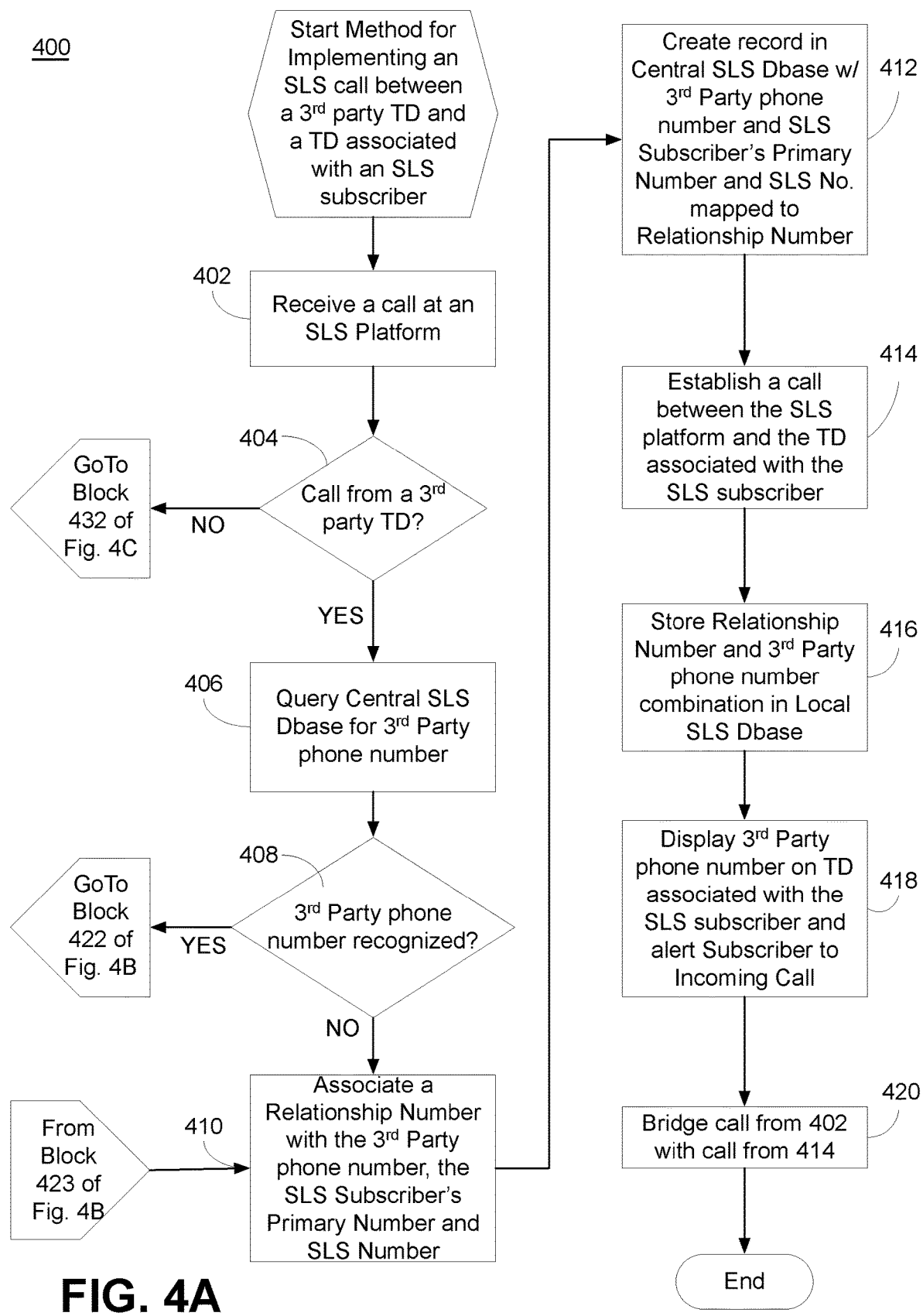
FIGS. 4A-4E collectively illustrate an exemplary method 400 for implementing an SLS call between a third party TD and a TD associated with an SLS subscriber when the call signal from the subscriber TD does not include the CLID or any other data useful for identification of the phone number being used by and associated with subscriber TD for the call.
Figure 4B:
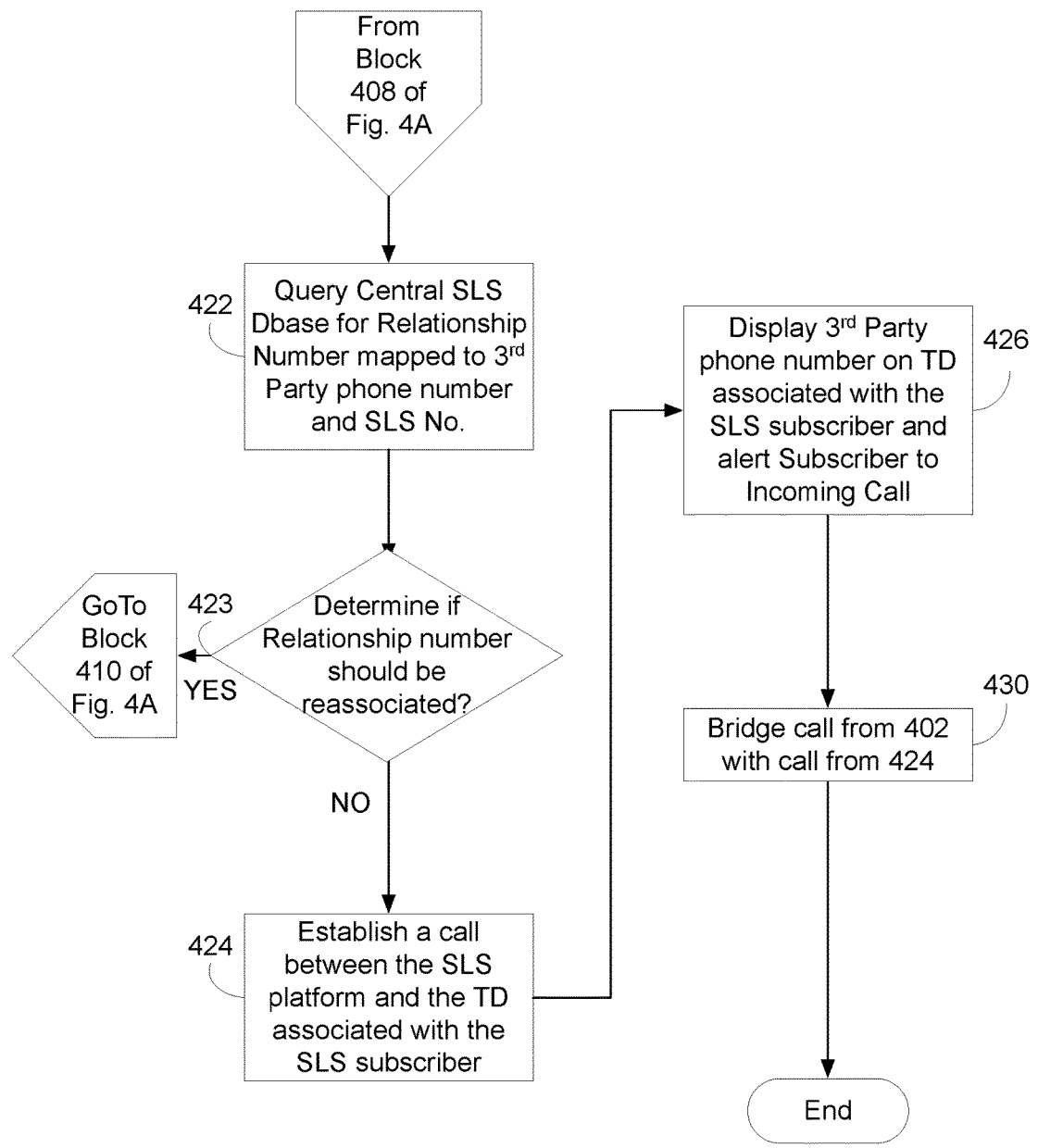

Turning now to FIG. 4B, if the "yes" branch is followed from decision block 408 of FIG. 4A, at block 422 the SLS platform 115 queries the central SLS database 116 for the relationship number that maps to the combination of the phone number being used by third party TD 120 and subscriber's SLS phone number. At block 423, the SLS platform 115 determines if it should modify the relationship number of block 422 based on the location of the subscriber TD 110. If at decision block 423 the SLS platform 115 determines that it should modify the relationship number of block 422, then the "yes" branch is followed to block 410 of FIG. 4A. If at decision block 423 the SLS platform 115 determines that it should not modify the relationship number of block 422, then the "no" branch is followed to block 424.

At block 424, a call is established between the SLS platform 115 and the subscriber TD 110. In some non-limiting embodiments of block 424, the SLS platform 115 initiates the call through the communication network 125's voice channel with the subscriber TD 110 by dialing its primary phone number from the relationship number of block 422. In other non-limiting embodiments of block 414, the subscriber's TD 110 initiates the call through the communication network 125's voice channel with the SLS platform 115 by dialing the relationship number of block 422 from the subscriber TD 110's primary phone number after receiving a data communication from the SLS platform 115 with information containing the relationship number of block 422 and instructions to initiate the call. In certain non-limiting embodiments of block 414, the SLS platform 115 may populate the CLID field of the call between it and the subscribers TD 110 with a combination of the assigned relationship number and the phone number being used by third party TD 120 to make the call.

It is envisioned that in some embodiments of block 424 an SLS module 105 may recognize that an incoming call is from the SLS platform 115 by virtue of the call originating from a relationship number. At block 426, the phone number being used by third party TD 120 to make the call is displayed to the SLS subscriber and the SLS subscriber is alerted to the incoming call. Notably, it is envisioned that displaying the phone number being used by third party TD 120 to make the call may include rendering the CLID itself, rendering a picture of the third party, rendering a name, etc. as is understood by those with ordinary skill in the art of graphical user displays and interfaces. In certain non-limiting embodiments of block 426, the information populated by the SLS platform 115 in the CLID field of the call between SLS platform 115 and the subscribers TD 110 may cause the SLS module 105 to handle the call and display the associated third party CLID for the benefit of the subscriber.

At block 430, the call from block 402 is bridged with the call from block 424 resulting in an active call between third party TD 120 and subscriber TD 110. One of ordinary skill in the art will recognize that there are many systems and methods known and understood for bridging or connecting a plurality of separate calls (the legs of the SLS); consequently, this disclosure is not limited by the used example "bridged." It is envisioned that, if the subscriber elects not to answer a call to the SLS phone number, the SLS module 105 in some non-limiting embodiments may use a voicemail service or message service in response to the unanswered call. That is, it is envisioned that an SLS service may provide features and services dedicated to the SLS subscriber and separate from similar features and services associated with the subscriber's primary number.

Figure 4C:
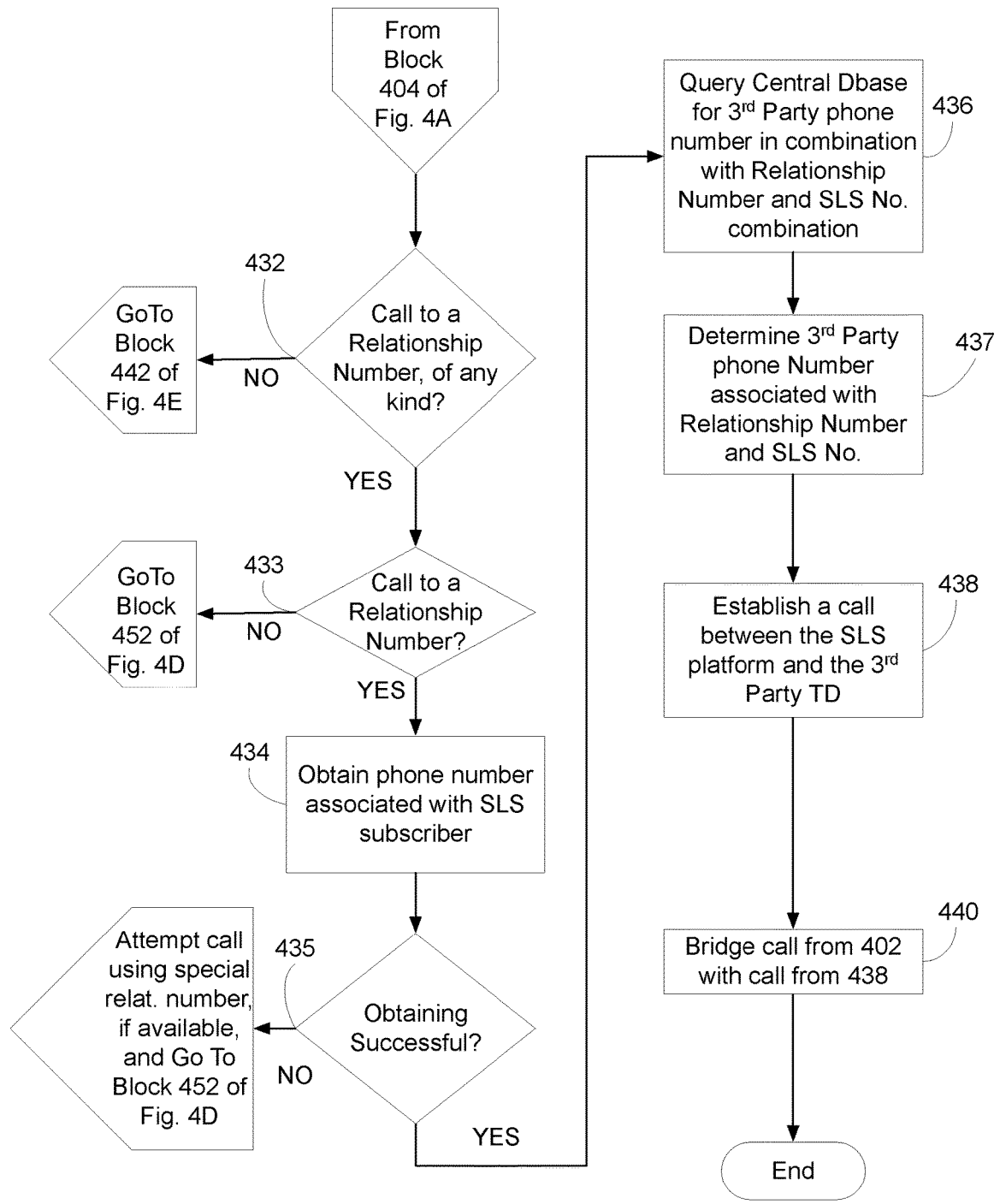

Turning now to FIG. 4C, if the "no" branch is followed from block 404 of FIG. 4A, at decision block 432 the SLS platform 115 determines if the call was directed to a relationship number of any kind (relationship number or special relationship number). Notably, if the call is directed to a relationship number of any kind, then it must have originated from a subscriber TD 110. If the call was not directed to a relationship number of any kind, the "no" branch is followed to block 442 of FIG. 4E. If, however, the call was routed to the SLS platform 115 because it was directed to a relationship number of any kind then the "yes" branch is followed to block 433.

At block 433, the SLS platform 115 determines if the call was directed to a relationship number (as distinct from a special relationship number). If the call was not directed to a relationship number, the "no" branch is followed to block 452 of FIG. 4D. If, however, the call was routed to the SLS platform 115 because it was directed to a relationship number then the "yes" branch is followed to block 434.

At block 434, the SLS platform 115 attempts to obtain the phone number being used by subscriber TD 110 to call the relationship number. If at decision block 435, the SLS platform 115 is unable to obtain the phone number being used by subscriber TD 110 because the call signal from the subscriber TD 110 does not include the CLID or any other data useful for identification of the phone number being used by and associated with subscriber TD 110 for the call to the relationship number, then the "no" branch is followed to block 452 of FIG. 4D. If the SLS platform 115 is able to successfully obtain the phone number being used by subscriber TD 110 to call the relationship number, then the "yes" branch is followed to block 436.

At block 436, the central SLS database 116 is queried for the third party TD 120's phone number in combination with the relationship number that was dialed by subscriber TD 110 that resulted in the call routing to the SLS platform 115, the SLS phone number and the phone number being used by subscriber TD 110 to call the relationship number. At block 437, the SLS platform 115 determines the third party TD 120's phone number with which the relationship number and the phone number being used by subscriber TD 110 to call the relationship number is associated. At block 438, a call is established between the SLS platform 115 and the third party TD 120. In some non-limiting embodiments of block 438, the SLS platform 115 initiates the call through the communication network 125's voice channel with the third party TD 120 by dialing the third party TD 120's phone number determined in block 436. In another non-limiting embodiments of block 438, the SLS platform 115 initiates the call through the communication network 125's data channel with the third party TD 120 by dialing the third party TD 120's phone number determined in block 436. In some non-limiting embodiments of block 438, the SLS platform 115 may populate the CLID field of the call between it and the third party TD 120 with the SLS phone number of subscriber TD 110. In other non-limiting embodiments of block 438, the SLS platform 115 may populate the CLID field of the call between it and the third party TD 120 with the primary phone number of subscriber TD 110.

At block 440, the call from block 402 is bridged with the call from block 438 resulting in an active call between subscriber TD 110 and third party TD 120. One of ordinary skill in the art will recognize that there are many systems and methods known and understood for bridging or connecting a plurality of separate calls (the legs of the SLS); consequently, this disclosure is not limited by the used example "bridged." It is envisioned that, if the third party elects not to answer a call to it from SLS, the SLS platform 115 in some non-limiting embodiments may continue the bridge even when the call from block 438 is routed to its voicemail service or message service.

Figure 4D:
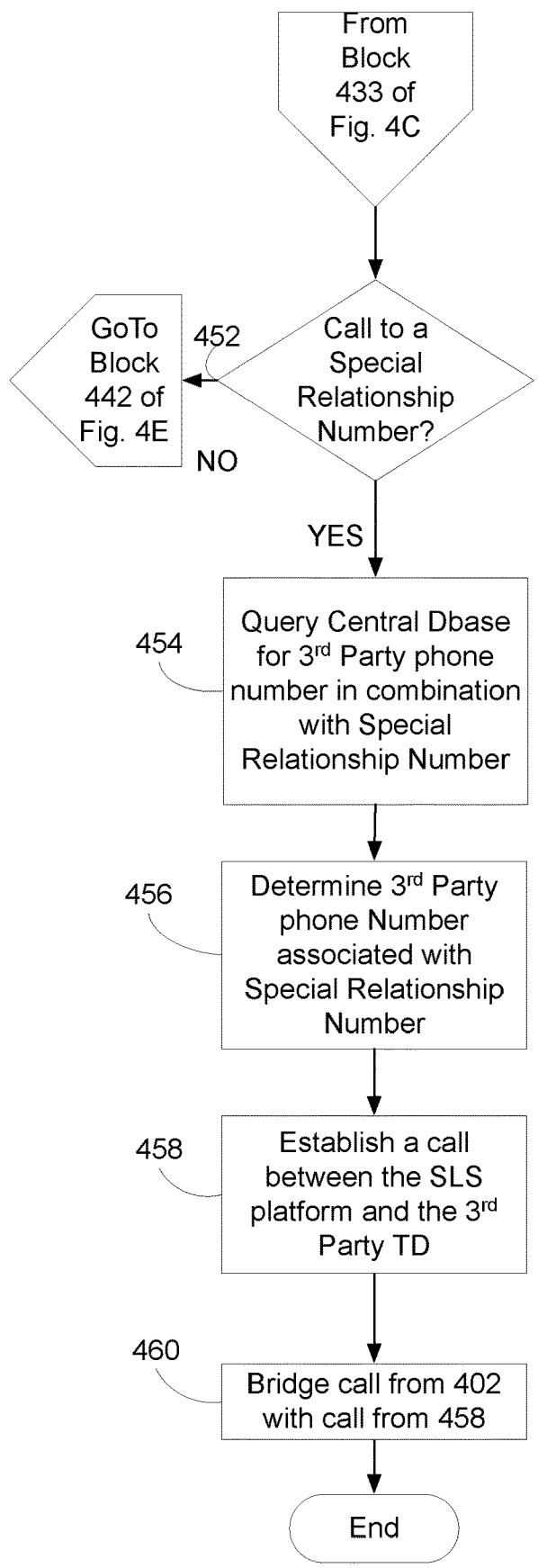

Turning now to FIG. 4D, if the "no" branch is followed from block 433 of FIG. 4C, at decision block 452 the SLS platform 115 determines if the call was directed to a special relationship number (as distinct from a relationship number). If the call was not directed to a special relationship number, then the "no" branch is followed to block 442 of FIG. 4E. If, however, the call was directed to a special relationship number, then the "yes" branch is followed to block 454.

At block 454, the central SLS database 116 is queried for the third party TD 120's phone number in combination with the special relationship number that was dialed by subscriber TD 110 that resulted in the call routing to the SLS platform 115. At block 456, the SLS platform 115 determines the third party TD 120's phone number with which the special relationship number is associated. At block 458, a call is established between the SLS platform 115 and the third party TD 120. In some non-limiting embodiments of block 458, the SLS platform 115 initiates the call through the communication network 125's voice channel with the third party TD 120 by dialing the third party TD 120's phone number determined in block 456. In other non-limiting embodiments of block 458, the SLS platform 115 initiates the call through the communication network 125's data channel with the third party TD 120 by dialing the third party TD 120's phone number determined in block 456. In some non-limiting embodiments of block 458, the SLS platform 115 may populate the CLID field of the call between it and the third party TD 120 with the SLS phone number of subscriber TD 110. In other non-limiting embodiments of block 458, the SLS platform 115 may populate the CLID field of the call between it and the third party TD 120 with the primary phone number of subscriber TD 110.

At block 460, the call from block 402 is bridged with the call from block 458 resulting in an active call between subscriber TD 110 and third party TD 120. One of ordinary skill in the art will recognize that there are many systems and methods known and understood for bridging or connecting a plurality of separate calls (the legs of the SLS); consequently, this disclosure is not limited by the used example "bridged." It is envisioned that, if the third party elects not to answer a call to it from SLS, the SLS platform 115 in some non-limiting embodiments may continue the bridge even when the call from block 458 is routed to its voicemail service or message service.

Figure 4E:
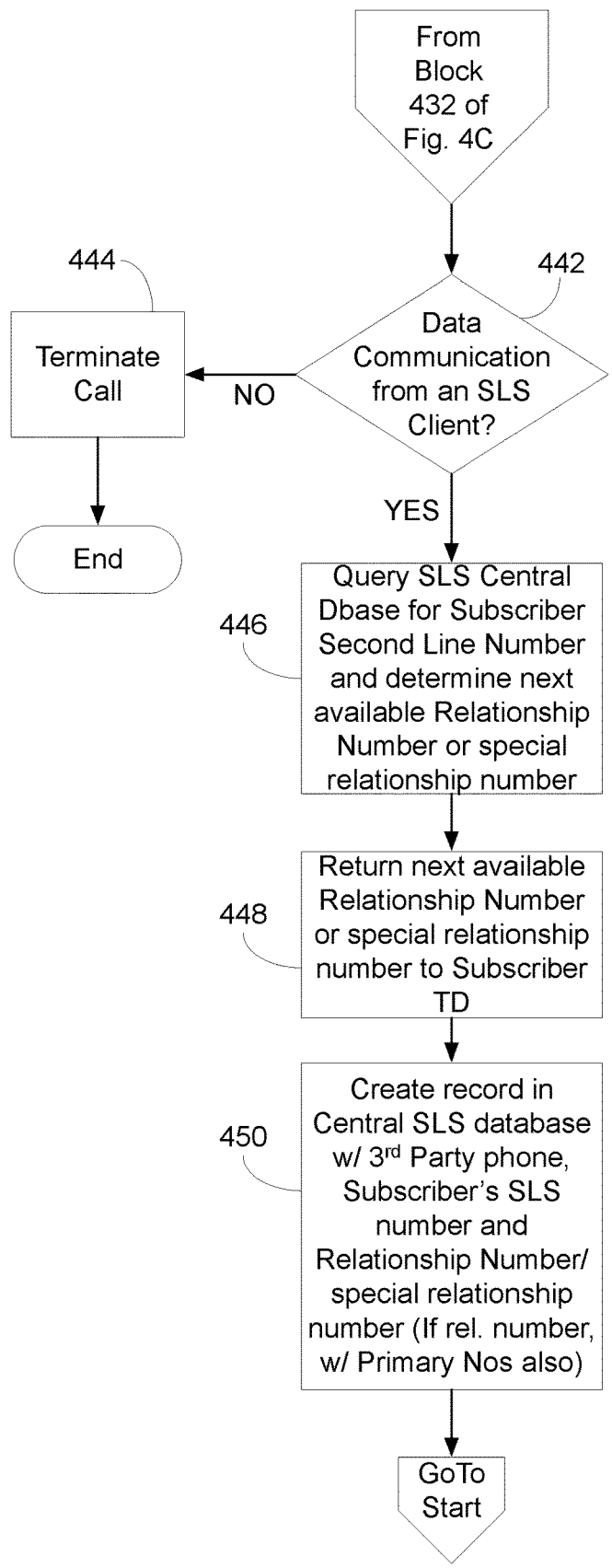

Turning now to FIG. 4E, if the "no" branch is followed from block 432 of FIG. 4C or block 452 of FIG. 4D, at decision block 442 the SLS platform 115 determines that the communication is a data communication over communications network 125 that originated from an SLS client of a subscriber TD 110. If not, then it is assumed that it was an errant communication and the "no" branch is followed to block 444 and the communication is disconnected. If the communication did originate from a SLS client, i.e., an SLS module 105 in a subscriber TD 110 associated with a subscriber to the SLS service, then the "yes" branch is followed to block 446. It is envisioned that the communication from an SLS client application to an SLS platform may be of any protocol suitable for communicating over communications network 125 including the use of protocols and standards such as, but not limited to, SS7 protocol suite, SIP, CAMEL or CAP, ROSE, VOIP, etc.

At block 446, it is deduced by the SLS platform 115 that the subscriber associated with the calling SLS client desires to use the SLS service to call third party TD 120's phone number with which no relationship number of any kind has been previously associated (such as would occur at block 410). The SLS module 105 has provided the request for the new relationship number of any kind (the request specifies if it is for a relationship number or a special relationship number depending on the circumstances), along with the third party number it desires to call, to the SLS platform 115 via the data communication. The central SLS database 116 is queried at block 446 to determine the next available relationship number or special relationship number for the subscriber's given SLS phone number.

The SLS platform 115 may associate a new relationship number with the subscriber's SLS phone number, the SLS subscriber's primary phone number and the third party TD 120's phone number. The SLS platform 115 may associate a new special relationship number with the subscriber's SLS phone number and the third party TD 120's phone number. It is envisioned that this associating may take into consideration whether subscriber TD 110 is roaming. One of ordinary skill in the art will recognize that that the SLS provider, the SLS platform 115, etc. can determine the location of an SLS subscriber through a variety of system or methods. Non-limiting examples of these methods and system include GPS location service on the TD, access to the geographic information of the network, direct communication with the SLS subscriber as to their immediate location, etc.

It is envisioned that the SLS module 105 may communicate with the SLS platform 115 in some embodiments to obtain a relationship number or a special relationship number for a third party that has not previously been called via a session-based protocol such as, but not limited to, an unstructured supplementary services data ("USSD") protocol. As is understood in the art of telecommunications protocols, a gateway such as a USSD gateway may be used to route messages from a signaling network to service applications and back. In this way, certain embodiments of an SLS module 105 may communicate with an SLS platform 115 to designate and acquire a relationship number or a special relationship number to a third party who has not been called by the subscriber before via the SLS (or, for that matter, a third party who has not placed a call to the subscriber's SLS phone number before).

Moreover, USSD is offered herein for exemplary purposes and is not meant to limit the type of communications protocol that may be used by certain embodiments. For example, it is envisioned that short message service ("SMS") protocol, multimedia messaging service ("MIMS") protocol, and/or other protocols may be used by some embodiments. It is envisioned that an IP-based interaction over the TD's data service may be used by some embodiments. As would be recognized by one of ordinary skill in the art, use of session based protocols or other communication protocols may minimize temporal delays in allocating and acquiring relationship numbers between an SLS module 105 and an SLS platform 115. In fact, it is anticipated that any mechanism that can be used to establish a communication path between the SLS module 105 and the SLS platform 115 for the purposes of supporting the SLS can be utilized. This may include any of the varieties of cellular data, WiFi, Bluetooth technologies, proprietary wireless or wired technologies, etc. Such channels can be used in setting up the relationship databases, sharing information between the SLS module 105 and the SLS platform 115, initiating voice communication establishment from the TD 110 to the SLS platform 115, the TD 110 requesting the SLS platform 115 to place a call to a third party TD 120, etc.

At block 448, the determined next available relationship number or special relationship number is returned to the SLS module 105 of the subscriber TD 110. At block 450, the central SLS database 116 is updated with the new relationship number or the new special relationship number. The new relationship number is now associated in the central SLS database 116 with the subscriber's SLS phone number, the SLS subscriber's primary phone number and the third party TD 120's phone number. The new special relationship number is now associated in the central SLS database 116 with the subscriber's SLS phone number and the third party TD 120's phone number. Notably, after blocks 448 and/or 450, the method 400 may return to the start of method 400 at block 402 as the SLS module 105 of the subscriber TD 110 has acquired a new relationship number or new special relationship number in association with a third party TD 120'S phone number. Consequently, using the newly acquired relationship number or special relationship number may essentially start over the method 400 with the SLS platform 115 receiving the call. If so, the method 400 would follow to FIG. 4C where the call was recognized as the subscriber TD 110 having placed a call to the new relationship number or new special relationship number.

Certain steps or blocks in the processes or process flows described in this specification naturally precede others for the invention to function as described. However, the invention is not limited to the order of the steps or blocks described if such order or sequence does not alter the functionality of the invention. That is, it is recognized that some steps or blocks may performed before, after, or parallel (substantially simultaneously with) other steps or blocks without departing from the scope and spirit of the invention. In some instances, certain steps or blocks may be omitted or not performed without departing from the invention. Also, in some instances, multiple actions depicted and described as unique steps or blocks in the present disclosure may be comprised within a single step or block. Further, words such as "thereafter", "then", "next", "subsequently", etc. are not intended to limit the order of the steps or blocks. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another.

A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, acoustic and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A memory device in a communication device comprising a mobile application which is executed by a processor to perform the actions of:

communicatively coupling the mobile communications device to a special service platform through a network to obtain a relationship number and to associate the relationship number with a first network recognizable number assigned to the mobile communications device and a second network recognizable number assigned to a third-party communications device;

in response to a user actuating the mobile communications device by dialing the relationship number, initiating a communication to the relationship number, whereby the relationship number is a network recognizable number that the network terminates at the special service platform and whereby the special service platform directs the call towards the second network recognizable number assigned to the third-party communications device and associated with the relationship number; and in response to receiving an incoming communication, wherein a calling line identifier is set to the relationship number, the mobile application using the relationship number to identify the second network recognizable number assigned to the third-party communications device that is initiating the incoming communication.

2. The mobile application of claim 1 further configured to perform the action of presenting on a display of the mobile communications device, an indication that the incoming communication has been initiated from the second network recognizable number assigned to the third-party communications device.

3. The mobile application of claim 2, wherein in response to receiving an incoming communication being further configured to perform the actions of:

receiving a call accept actuation of a user interface of the mobile communications device; and terminating the incoming communication at the mobile communications device, wherein the incoming communication is established over a cellular network.

4. The mobile application of claim 1, wherein the mobile communications device includes a cellular service provider number and the first network recognizable number is the cellular service provider number, and wherein the action of initiating a communication to the relationship number further comprises populating a calling identifier with the cellular service provider number.

5. The mobile application of claim 1, wherein the mobile communications device includes a cellular service provider number and a second line service number, and the first network recognizable number is the second line service number, and wherein the action of initiating a communication to the relationship number further comprises populating a calling identifier with the second line service number.

6. The mobile application of claim 1, wherein the mobile communications device includes a cellular service provider number and the first network recognizable number is the cellular service provider number.

7. The mobile application of claim 1, wherein the mobile communications device includes a cellular service provider number and a second line service number, and the first network recognizable number is the second line service number.

8. A memory device in a communication device comprising a mobile application which is executed by a processor to:

couple the mobile communications device to a special service platform through a network to obtain a relationship number and to associate the relationship number with a first network recognizable number assigned to the mobile communications device and a second network recognizable number assigned to a third-party communications device;

in response to a user actuating the mobile communications device by dialing the relationship number, initiate a communication to the relationship number, whereby the relationship number is a network recognizable number that the network terminates at the special service platform and whereby the special service platform directs the call towards the second network recognizable number assigned to the third-party communications device and associated with the relationship number; and in response to receiving an incoming communication, wherein a calling line identifier is set to the relationship number, use the relationship number to identify the second network recognizable number assigned to the third-party communications device that is initiating the incoming communication.

9. The mobile application of claim 8, wherein the terminating code is further configured to present on a display of the mobile communications device, an indication that the incoming communication has been initiated from the second network recognizable number assigned to the third-party communications device.

10. The mobile application of claim 9, wherein the terminating code is further configured, in response to receiving an incoming communication, to:

receive a call accept actuation of a user interface of the mobile communications device; and terminate the incoming communication at the mobile communications device, wherein the incoming communication is established over a cellular network.

11. The mobile application of claim 8, wherein the mobile communications device includes a cellular service provider number and the first network recognizable number is the cellular service provider number, and wherein the originating code is further configured to initiate populate a calling identifier with the cellular service provider number.

12. The mobile application of claim 8, wherein the mobile communications device includes a cellular service provider number and a second line service number, and the first network recognizable number is the second line service number, and wherein the originating code is further configured to populate a calling identifier with the second line service number.

13. The mobile application of claim 8, wherein the mobile communications device includes a cellular service provider number and the first network recognizable number is the cellular service provider number.

14. The mobile application of claim 1, wherein the mobile communications device includes a cellular service provider number and a second line service number, and the first network recognizable number is the second line service number.

* * * * *